US007535614B1

(12) United States Patent
Tapley et al.

(10) Patent No.: US 7,535,614 B1
(45) Date of Patent: May 19, 2009

(54) ELECTRICAL WINDOW CONTROL SYSTEM AND METHOD THEREOF

(75) Inventors: Donald L. Tapley, Holland, MI (US); Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 12/127,571

(22) Filed: May 27, 2008

(51) Int. Cl.
 G02F 1/15 (2006.01)
 G02B 27/00 (2006.01)
 G09G 3/08 (2006.01)
(52) U.S. Cl. .................. 359/265; 359/275; 359/609; 359/900; 345/105
(58) Field of Classification Search ......... 359/265–275, 359/609, 900, 239, 241; 345/49, 105
 See application file for complete search history.

(56) References Cited

U.S. PATENT DOCUMENTS

| 4,640,583 | A | 2/1987 | Hoshikawa et al. |
| 4,671,619 | A | 6/1987 | Kamimori et al. |
| 4,702,566 | A | 10/1987 | Tukude |
| 4,893,908 | A | 1/1990 | Wolf et al. |
| 4,917,477 | A | 4/1990 | Bechtel et al. |
| RE33,343 | E | 9/1990 | Bitter et al. |
| 4,958,917 | A | 9/1990 | Hashimoto et al. |
| 4,972,176 | A | 11/1990 | Vallance |
| 5,004,961 | A | 4/1991 | Berner et al. |

(Continued)

FOREIGN PATENT DOCUMENTS

DE 3128964 A1 2/1983

(Continued)

OTHER PUBLICATIONS

R. Sullivan et al., "Effect of switching control strategies on the energy performance of electrochromic windows," SPIE (1994), pp. 443-455, vol. 2255, Energy and Environment Division, Lawrence Berkeley Laboratory, Berkeley, California.

(Continued)

*Primary Examiner*—William C Choi
*Assistant Examiner*—Jack Dinh
(74) *Attorney, Agent, or Firm*—Price, Heneveld, Cooper, DeWitt & Litton, LLP

(57) ABSTRACT

An electrical window control system and method thereof are provided, wherein the system includes a variable transmission window having first and second substantially transparent substrates that define an area, and a variable transmittance material that occupies at least a portion of the area. The system further includes a power source that supplies an electrical power, at least one light source that emits light towards the variable transmission window, and at least one sensor in optical communication with the light source, wherein the at least one sensor receives at least a portion of the light that propagates through at least one of the first and second substantially transparent substrates, and communicates a signal that corresponds to the received light. The system further includes a controller in communication with the at least one sensor, wherein the controller receives and compares the signal communicated from the at least one sensor to a reference value, and controls the electrical power supplied to the variable transmittance material, such that a transmittance of the variable transmission window is altered with respect to the light received by the at least one sensor.

60 Claims, 12 Drawing Sheets

U.S. PATENT DOCUMENTS

| | | |
|---|---|---|
| 5,066,111 A | 11/1991 | Singleton et al. |
| 5,076,673 A | 12/1991 | Lynam et al. |
| 5,092,939 A | 3/1992 | Nath et al. |
| 5,099,624 A | 3/1992 | Valentin |
| 5,124,832 A | 6/1992 | Greenberg et al. |
| 5,136,419 A | 8/1992 | Shabrang |
| 5,161,048 A | 11/1992 | Rukavina |
| 5,228,925 A | 7/1993 | Nath et al. |
| 5,233,461 A | 8/1993 | Dornan et al. |
| 5,244,709 A | 9/1993 | Vanderstukken |
| 5,336,448 A | 8/1994 | Byker |
| 5,384,578 A | 1/1995 | Lynam et al. |
| 5,384,653 A | 1/1995 | Benson et al. |
| 5,589,958 A | 12/1996 | Lieb |
| 5,612,847 A | 3/1997 | Malecke et al. |
| 5,654,736 A | 8/1997 | Green et al. |
| 5,657,149 A | 8/1997 | Buffat et al. |
| 5,671,387 A | 9/1997 | Jacobs et al. |
| 5,724,176 A | 3/1998 | Nishikitani et al. |
| 5,725,809 A | 3/1998 | Varaprasad et al. |
| 5,805,330 A | 9/1998 | Byker et al. |
| 5,838,483 A | 11/1998 | Teowee et al. |
| 5,856,211 A | 1/1999 | Tonazzi et al. |
| 5,889,608 A | 3/1999 | Buffat et al. |
| 5,940,150 A | 8/1999 | Faris et al. |
| 5,940,216 A | 8/1999 | Gibbs |
| 5,973,819 A | 10/1999 | Pletcher et al. |
| 5,978,126 A | 11/1999 | Sjursen |
| 5,995,273 A | 11/1999 | Chandrasekhar |
| 6,020,989 A | 2/2000 | Watanabe |
| 6,045,724 A | 4/2000 | Varaprasad et al. |
| 6,055,088 A | 4/2000 | Fix et al. |
| 6,055,089 A | 4/2000 | Schulz et al. |
| 6,056,410 A | 5/2000 | Hoekstra et al. |
| 6,064,509 A | 5/2000 | Tonar et al. |
| 6,084,702 A | 7/2000 | Byker et al. |
| 6,142,639 A | 11/2000 | Jain et al. |
| 6,166,496 A | 12/2000 | Lys et al. |
| 6,207,083 B1 | 3/2001 | Varaprasad et al. |
| 6,210,008 B1 | 4/2001 | Hoekstra et al. |
| 6,214,261 B1 | 4/2001 | Smarto et al. |
| 6,239,898 B1 | 5/2001 | Byker et al. |
| 6,245,262 B1 | 6/2001 | Varaprasad et al. |
| 6,254,003 B1 | 7/2001 | Pettinelli et al. |
| 6,280,041 B1 | 8/2001 | Unger et al. |
| 6,297,900 B1 | 10/2001 | Tulloch et al. |
| 6,317,248 B1 | 11/2001 | Agrawal et al. |
| 6,373,618 B1 | 4/2002 | Agrawal et al. |
| 6,396,408 B2 | 5/2002 | Drummond et al. |
| 6,407,847 B1 | 6/2002 | Poll et al. |
| 6,449,082 B1 | 9/2002 | Agrawal et al. |
| 6,493,128 B1 | 12/2002 | Agrawal et al. |
| 6,501,457 B1 | 12/2002 | Bruechmann et al. |
| 6,528,782 B1 | 3/2003 | Zhang et al. |
| 6,567,708 B1 | 5/2003 | Bechtel et al. |
| 6,574,515 B1 | 6/2003 | Kirkpatrick et al. |
| 6,594,067 B2 | 7/2003 | Poll et al. |
| 6,671,080 B2 | 12/2003 | Poll et al. |
| 6,829,511 B2 | 12/2004 | Bechtel et al. |
| 2006/0056003 A1 | 3/2006 | Tonar et al. |
| 2007/0201122 A1 | 8/2007 | Dozeman et al. |
| 2007/0285759 A1 | 12/2007 | Ash et al. |

FOREIGN PATENT DOCUMENTS

| | | |
|---|---|---|
| DE | 8507963 U1 | 8/1986 |
| EP | 0947874 A2 | 10/1999 |
| EP | 0947875 A2 | 10/1999 |
| EP | 0947876 A2 | 10/1999 |
| EP | 0964288 A2 | 12/1999 |
| WO | 9857228 A1 | 12/1998 |

OTHER PUBLICATIONS

A.W. Czanderna et al., "Durability issues and service lifetime prediction of electrochromic windows for buildings applications," Solar Energy Materials & Solar Cells (1999), pp. 419-436, 56, Elsevier Science B.V., Golden, Colorado.

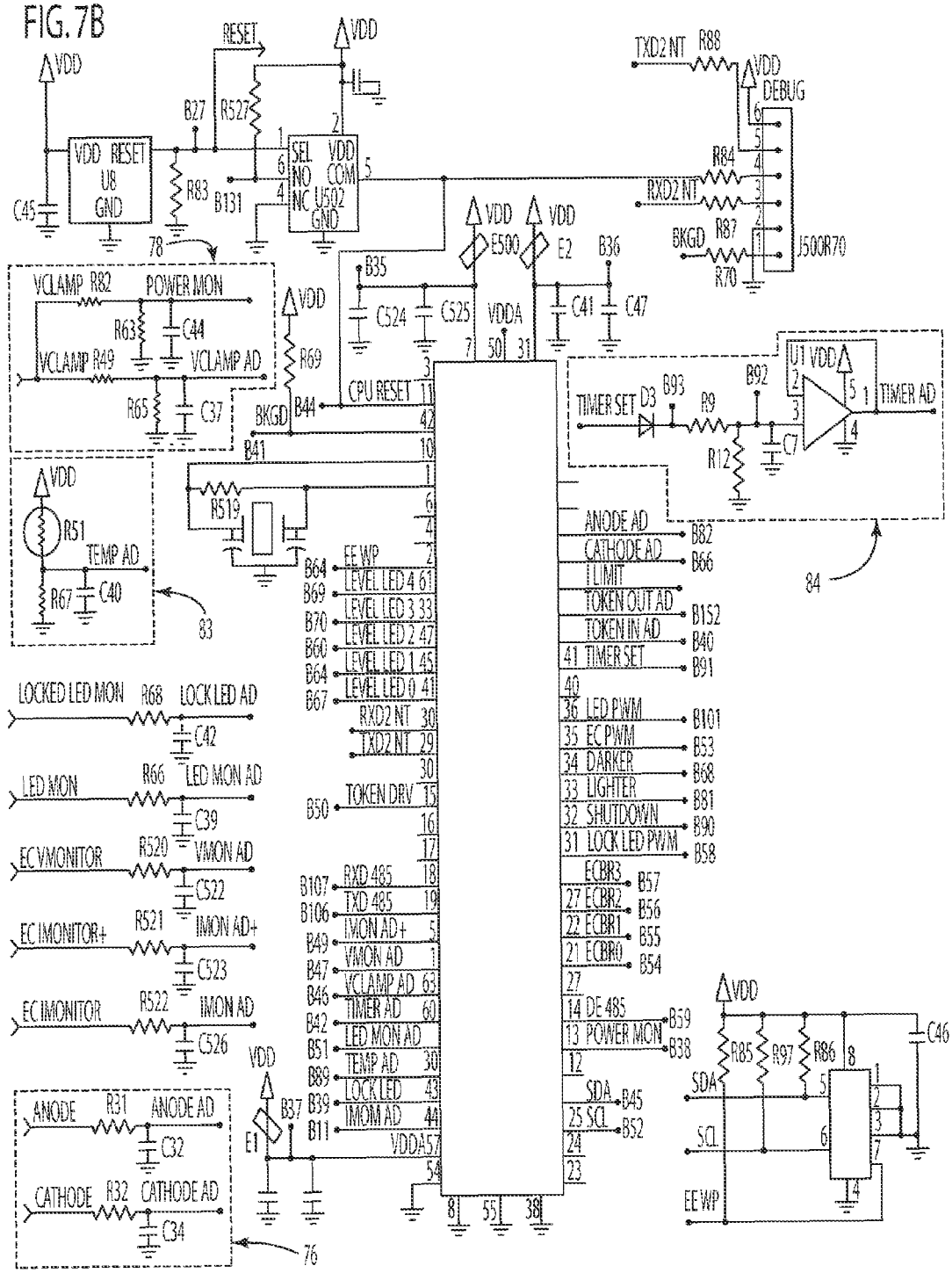

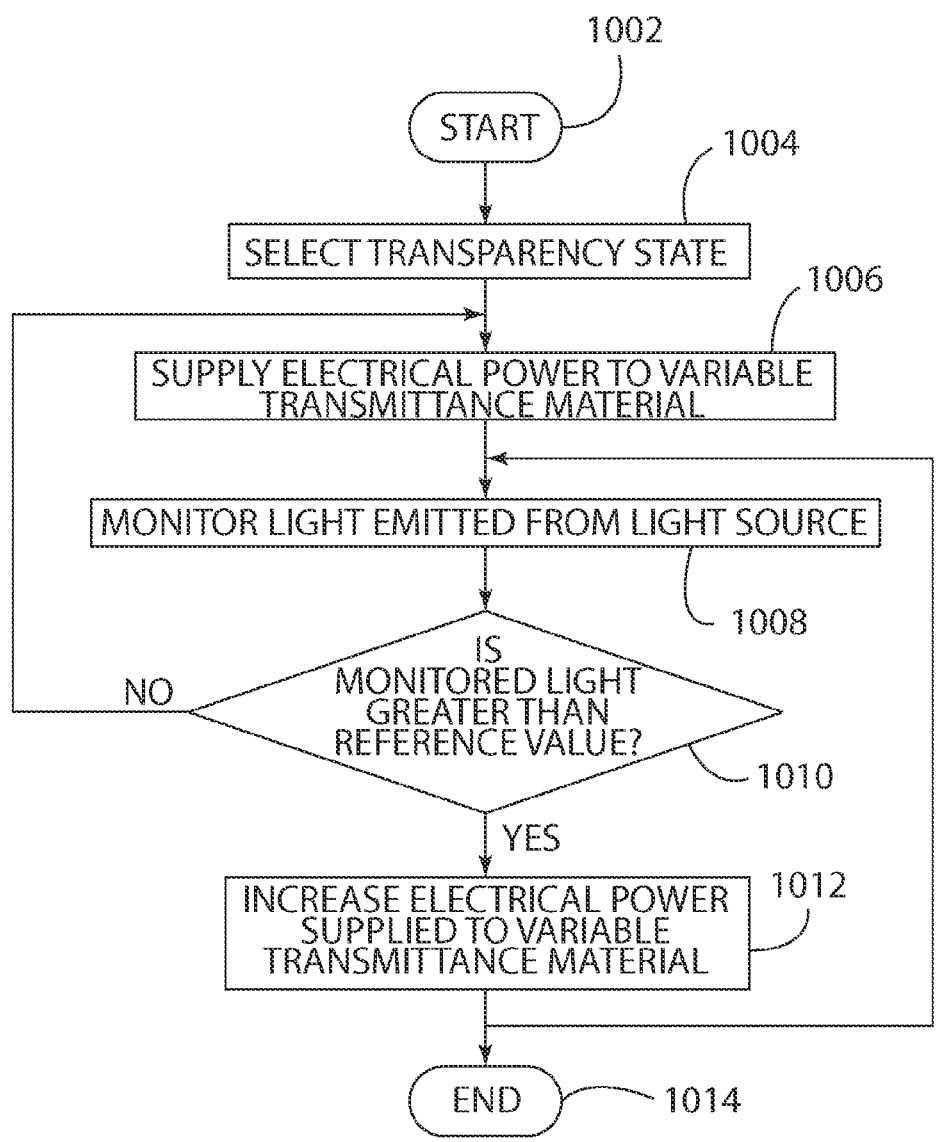

ELECTRICAL WINDOW CONTROL SYSTEM AND METHOD THEREOF

FIELD OF THE INVENTION

The present invention generally relates to an electrical window control system, and more particularly, to an electrical variable transmission window control system that monitors the state of a variable transmittance material, and controls the state of the variable transmittance material based upon the monitored state.

BACKGROUND OF THE INVENTION

Generally, variable transmittance light filters, such as electrochromic light filters, can be used in architectural windows, skylights, and in windows, sunroofs, and rearview mirrors for automobiles. Such variable transmittance light filters typically reduce the transmittance of direct or reflected sunlight during daytime through the window, while not reducing such transmittance during nighttime. Not only do such light filters reduce bothersome glare and ambient brightness, but they can also reduce fading and generated heat caused by the transmission of sunlight through the window.

Variable transmission windows generally have not been widely accepted commercially for several reasons. First, they tend to be very expensive due to the cost of materials required for their construction, and their complex construction can make mass-production difficult. Additionally, variable transmission windows tend to have a lower life expectancy than conventional windows due to degradation of some types of variable transmittance materials used in the windows. The combination of added cost and lower life expectancy has generally deterred many architects, designers, and builders from using variable transmission windows.

Generally, variable transmission windows have also not been widely accepted commercially in vehicles designed for the transportation of passengers, such as, for example, busses, airplanes, trains, ships, and automobiles. Exemplary challenges for providing variable transmission windows in such applications are, but not limited to, providing effective, coordinated, individual and central control of multiple variable transmission windows, providing multiple modes of operation responsive to individual or collective passenger needs, providing the ability to quickly change window transmittance states, minimizing system power consumption, protecting against environmental factors such as moisture and power surges, protecting windows from excessive heat and physical external loads, and providing user interfaces allowing relatively unsophisticated users to understand and control the windows. Additionally, challenges can generally be a barrier to providing system features needed to address the above-identified needs.

SUMMARY OF THE INVENTION

According to one aspect of the present invention, an electrical window control system includes a variable transmission window having a first substantially transparent substrate and a second substantially transparent substrate, wherein the first and second substantially transparent substrates define an area. The variable transmission window further includes a variable transmittance material that occupies at least a portion of the area. The electrical control system further includes a power source that supplies an electrical power to the variable transmittance material, wherein an altering of a transmittance state of the variable transmittance material is based upon altering the supplied electrical power, and at least one light source that emits light towards the variable transmission window, such that at least a portion of the emitted light propagates through at least one of the first and second substantially transparent substrates. The electrical control system also includes at least one sensor in optical communication with the at least one light source, wherein the at least one sensor receives at least a portion of the light that propagates through at least one of the first and second substantially transparent substrates, and communicates a signal that corresponds to the received light. Additionally, the electrical control system includes a controller in communication with the at least one sensor, wherein the controller receives and compares the signal communicated from the at least one sensor to a reference value, and the controller controls the electrical power supplied from the power source to the variable transmittance material based upon the comparison of the communicated signal and the reference value, such that the transmittance state of the variable transmittance material is altered with respect to the light received by the at least one sensor.

According to another aspect of the present invention, a method of electrically controlling a variable transmission window is provided that includes the steps of emitting light towards a variable transmission window, and propagating at least a portion of the emitted light through first and second substantially transparent substrates of the variable transmission window that define an area, wherein a variable transmittance material occupies at least a portion of the area. The method further includes the steps of supplying an electrical power to the variable transmittance material to control a transmittance state of the variable transmittance material, detecting the emitted light that propagates through the first and second substantially transparent substrates, and communicating a signal representative of the detected light. Additionally, the method includes the steps of receiving the communicated signal, such that the received signal is compared to a reference value, and altering the electrical power supplied to the variable transmittance material based upon the comparison of the received signal and the reference value, such that the state of the variable transmittance material is altered based upon the detected light.

According to yet another aspect of the present invention, a feedback control system is provided that includes a variable transmission window having a first substantially transparent substrate, a second substantially transparent substrate, wherein the first and second substantially transparent substrates define an area, and a variable transmittance material that occupies at least a portion of the area. The feedback control system further includes a power source that supplies an electrical power to the variable transmittance material, wherein an altering of a transmittance state of the variable transmittance material is based upon altering the supplied electrical power, and at least one light source that emits light towards the variable transmission window, such that at least a portion of the emitted light propagates through at least one of the first and second substantially transparent substrates based upon the transmittance state of the variable transmittance material. The feedback control system also includes at least one sensor in optical communication with the at least one light source, wherein the at least one sensor receives at least a portion of the emitted light that propagates through at least one of the first and second substantially transparent substrates, and communicates a feedback signal that corresponds to the received light, and a controller in communication with the at least one sensor, wherein the controller receives the feedback signal, and controls the electrical power supplied from the at least one power source to the variable transmittance material based upon the feedback signal, such that the transmittance state of the variable transmittance material is altered with respect to the light received by the at least one sensor.

These and other features, advantages and objects of the present invention will be further understood and appreciated by those skilled in the art by reference to the following specification, claims, and appended drawings.

BRIEF DESCRIPTION OF THE DRAWINGS

The present invention will now be described, by way of example, with reference to the accompanying drawings, in which:

FIGS. 7A-7E are schematic diagrams generally illustrating circuitry for a control system of a variable transmission window, in accordance with one embodiment of the present invention; and FIG. 8 is a flow chart illustrating a method of electrically controlling a transmittance state of a variable transmission window, in accordance with one embodiment of the present invention.

DETAILED DESCRIPTION OF PREFERRED EMBODIMENTS

Figure 1:
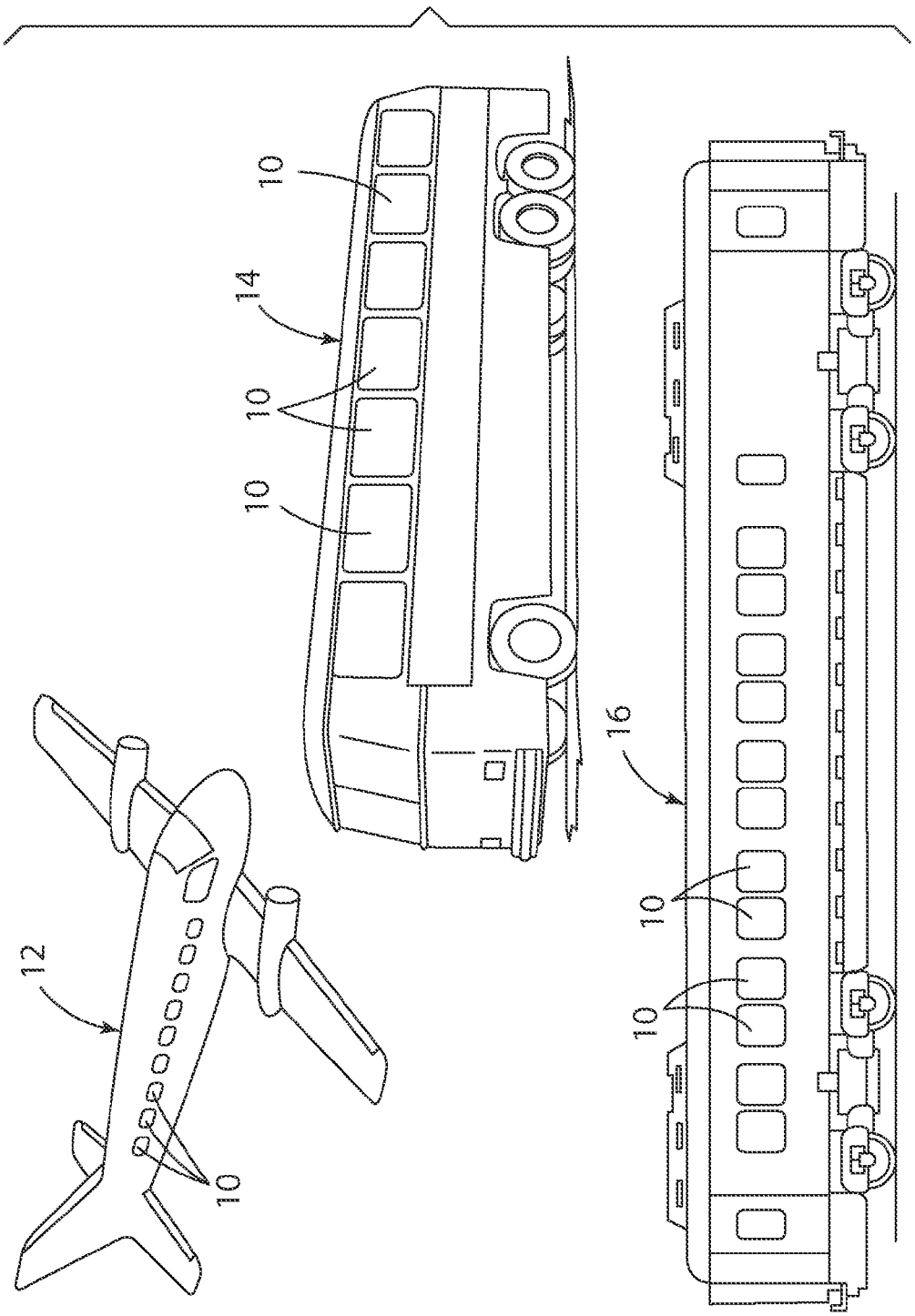
FIG. 1 is a general illustration of multi-passenger vehicles incorporating a variable transmission window, in accordance with one embodiment of the present invention.

Reference will now be made in detail to present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as shown in the drawings. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Generally, the present invention pertains to an electrical window control system in which a transmittance state of at least one variable transmission window is controlled and also pertains to various window constructions and various constructions of mechanical and electrical connectors in those window constructions that make it practical to employ the electrical control system of the present invention, according to one embodiment. Examples of variable transmission windows include windows that are able to change their transmissivity based upon electrical signals applied to the window, such as the windows generally described in commonly assigned U.S. Patent Application Publication No. 2007/0285759 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures each of which are hereby incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Patent Application Publication No. 2006/0056003 entitled "VEHICULAR REARVIEW MIRROR ELEMENTS AND ASSEMBLIES INCORPORATING THESE ELEMENTS," the entire disclosures each of which are hereby incorporated herein by reference. Other examples of variable transmission windows and systems for controlling them are disclosed in commonly assigned U.S. Pat. No. 7,085,609 entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," the entire disclosures each of which are hereby incorporated herein by reference.

In regards to FIG. 1, a graphical representation of multi-passenger vehicles employing variable transmission windows are shown, wherein the variable transmission windows are generally indicated at reference identifier 10. For purposes of explanation and not limitation, the variable transmission windows 10 can be used in mass transit multi-passenger vehicles, such as, but not limited to, an aircraft generally indicated at 12, a bus generally indicated at 14, and a train generally indicated at 16. It should be appreciated that other single or multi-passenger vehicles may employ variable transmission windows 10, wherein the variable transmission window 10 contains control hardware, one or more executable software routines, or a combination thereof, for controlling a transmittance state of the variable transmission window 10, as described in greater detail herein. However, the variable transmission window 10 described herein can be used in other environments or applications, wherein it is desirable to alter the transmittance state of a substrate, such as, but not limited to, architectural window applications.

Figure 2:
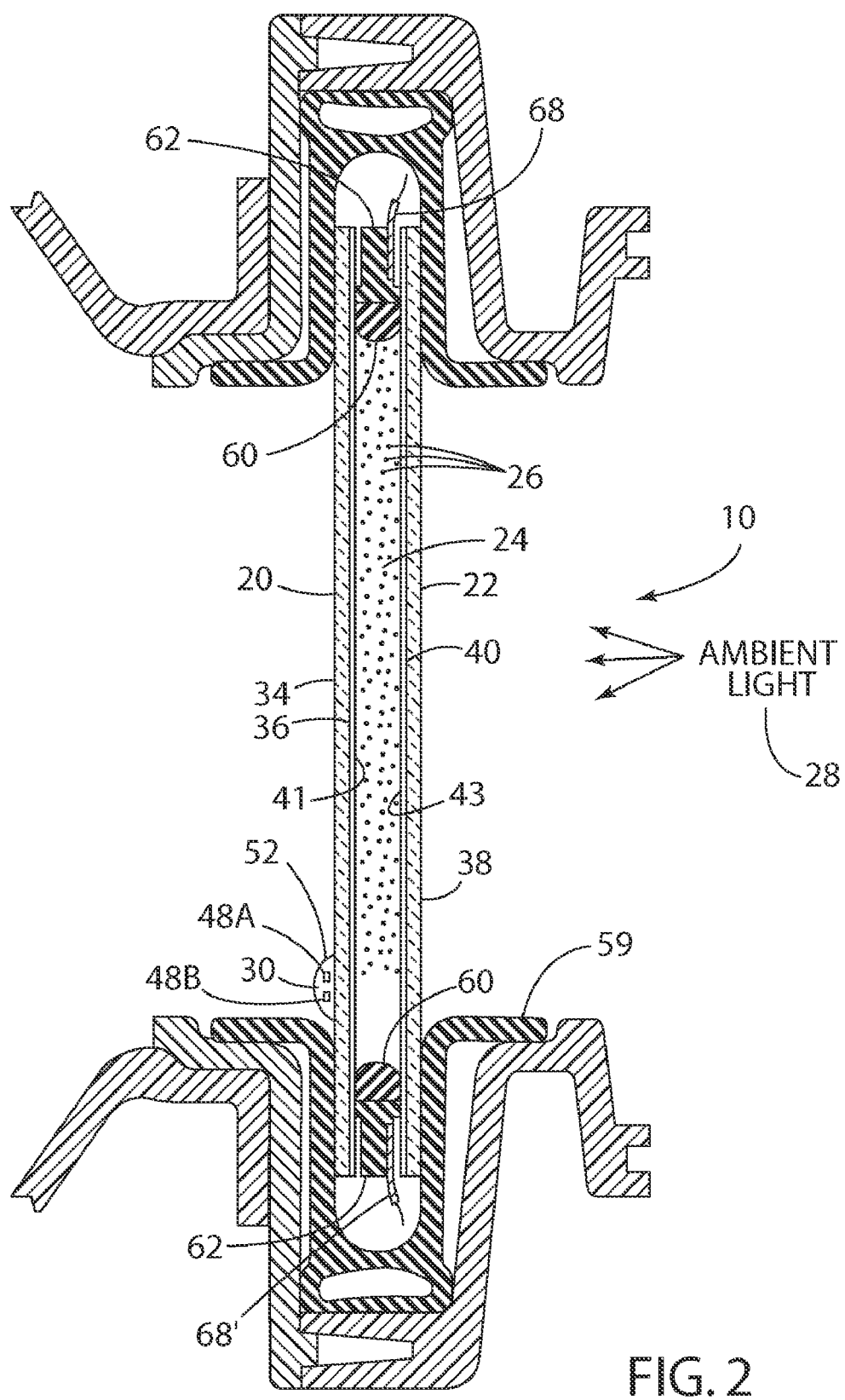
FIG. 2 is a partial cross-sectional view of a variable transmission window and supporting structure, in accordance with one embodiment of the present invention.
Figure 3:
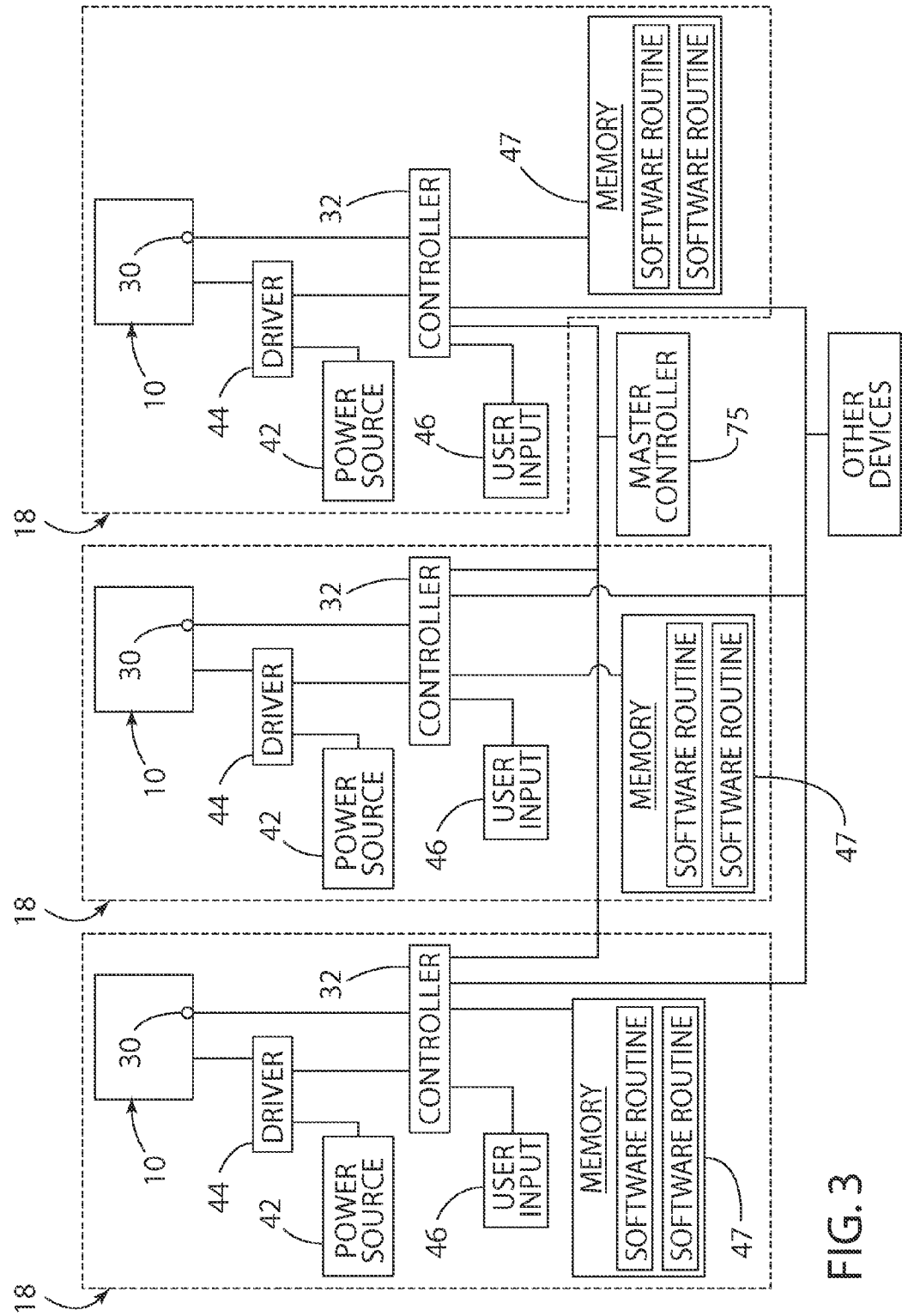
FIG. 3 is a block diagram generally illustrating a plurality of electrical window control systems, in accordance with one embodiment of the present invention.

With respect to both FIGS. 2 and 3, an electrical window control system is generally indicated in FIG. 3 at 18. The variable transmission window 10 of the electrical window control system 18 includes a first substantially transparent substrate 20 and a second substantially transparent substrate 22, wherein the first and second substantially transparent substrates 20,22 define an area 24, such that a variable transmittance material 26 occupies at least a portion of the area 24. The electrical window control system 18 further includes at least one light source 28 that emits light towards the variable transmission window 10, such that at least a portion of the emitted light substantially propagates through at least one of the first and second substantially transparent substrates 20,22. The electrical window control system 18 also includes at least one sensor 30 that is in optical communication with the light source 28, wherein the sensor 30 receives at least a portion of the light that propagates through at least one of the first and second substantially transparent substrates 20,22.

Additionally, as shown in FIG. 3, the electrical window control system 18 includes a controller 32 in communication with the sensor 30. The controller 32 receives and compares a signal communicated from the sensor 30 to the controller 32 to a reference value, wherein the controller 32 controls a transmittance state of the variable transmittance material 26 based upon the comparison of the communicated signal and the reference value, such that the transmittance state of the variable transmittance material 26 is altered with respect to the light received by the sensor 30, as described in greater detail herein.

Alternatively, the electrical control system 18 is a feedback control system, such that a closed loop is implemented to utilize a signal that corresponds to a monitored emitted light to control or alter a transmittance state of the variable transmission window 10. Thus, the controller 32 receives a feedback signal from the sensor 30, and controls the transmittance state of the variable transmittance material 26 based upon the feedback signal, such that the transmittance state is altered with respect to the light received by the sensor 30.

According to one embodiment, the variable transmittance material 26 is an electrochromatic (EC) material, such that the transmittance state of the EC material is altered based upon an electrical power supplied to the EC material. However, it should be appreciated that the variable transmittance material 26 can be any suitable material that is adapted to alter states to vary the transmittance of the variable transmittance material 26. According to one embodiment, the transmittance state of the variable transmittance material 26 is substantially transparent or substantially clear when the variable transmittance material 26 is at least approximately sixty percent (60%) transparent.

Additionally or alternatively, the first and second substantially transparent substrates 20,22 can be glass substrates having a desirable thickness, wherein the first substantially transparent substrate 20 has an exterior side 34 and an interior side 36, and the second substantially transparent substrate 22 has an exterior side 38 and an interior side 40 (FIG. 2). Thus, the light source 28 emits light, such that at least a portion of the emitted light propagates through the first and second substantially transparent substrates 20,22 and the variable transmittance material 26, so that at least a portion of the light is received by the sensor 30. According to one embodiment, the first and second substantially transparent substrates 20,22 are made of glass and have a thickness of less than about 1.2 millimeters (mm). In such an embodiment, the first and second substantially transparent substrates 20,22 can have a thickness less than about 0.8 mm, or less than about 0.6 mm. According to an alternate embodiment, the first and second substantially transparent substrates 20,22 can be bent.

By way of explanation and not limitation, the at least one light source 28 can be a light emitting diode (LED), an incandescent lamp, a laser diode, an ambient light source (such as solar), the like, or a combination thereof. In one embodiment, wherein the at least one light source 28 is an LED, the LED can emit light at a single visible or non-visible wavelength (e.g., a single color LED) or emit light at multiple visible and/or non-visible wavelengths (e.g., a multi-color LED). When a multi-color LED is implemented, the different color light (e.g., light at different wavelengths) can be emitted substantially simultaneously, at different times, or a combination thereof. One exemplary multi-color LED is a red-green-blue (RGB) LED. According to one embodiment, the sensor 30 can be a cadmium sulfide (CdS) cell, a phototransistor, a photodiode, a light sensing integrated circuit, or a combination thereof. Typically, the light source 28, sensor 30, controller 32, power source 42, driver 44, user input 44, or a combination thereof can be connected electrically and/or mechanically via a printed circuit board (PCB), a flex circuit, connection wiring, adhesive, a housing, or a combination thereof.

According to one embodiment, first and second substantially transparent substrates 20,22 can include a first and second electrically conductive layer 41,43, respectively, deposited thereon (FIG. 2). According to one embodiment, the electrically conductive layers 41,42 include indium-tin oxide (ITO) at a thickness of at least two, full waves. Alternatively, the electrically conductive layers 41,43 may be made fluorine-doped tin oxide, doped zinc oxide, indium zinc oxide ($Zn_xIn_yO_z$), the materials described in U.S. Pat. No. 5,202,787, entitled "ELECTRO-OPTIC DEVICE," the entire disclosure of which is hereby incorporated herein by reference, such as TEC 20 or TEC 15, available from Libby-Owens-Ford Co., of Toledo, Ohio, or other transparent electrically conductive materials, such as, for example, dielectric/metal/dielectric stacks, as described in U.S. Patent Application Publication No. 2006/0056003, entitled "VEHICULAR REARVIEW MIRROR ELEMENTS AND ASSEMBLIES INCORPORATING THESE ELEMENTS," and U.S. Patent Application Publication No. 2007/0201122, entitled "ELECTRO-OPTICAL ELEMENT INCLUDING METALLIC FILMS AND METHODS FOR APPLYING THE SAME," the entire disclosures of which are hereby incorporated herein by reference. The electrically conductive layers 41,43 can have a sheet resistance of less than about four Ohms per square (4.0Ω/☐). In such an embodiment, the sheet resistance of the electrically conductive layers 41,43 are less than about three ohms per square (3.0Ω/☐). In such an embodiment, the electrically conductive layers 41,43 are less than about 2.6Ω/☐, or less than about two ohms per square (2.0Ω/☐). Typically, the first substantially transparent substrate 20 and the second substantially transparent substrate 22 are mounted so that their surfaces are parallel to each other, such that the electrically conductive layer 41 deposited on the first substantially transparent substrate 20 is facing the electrically conductive layer 43 deposited on the second substantially transparent substrate 22.

Referring to FIG. 3 the electrical window control system 18 can further include one or more power sources 42, a driver 44, and a user input 46, according to one embodiment. In such an embodiment, the power source 42 provides electrical power to the driver 44, and the driver 44 supplies electrical power supplied from the power source 42 to the variable transmittance material 26 based upon the commands received from the controller 32. The electrical power supplied from the power source 42 to the variable transmittance material 26 through the driver 44 can be a voltage that is altered based upon commands received by the driver 44 from the controller 32, an electrical current that is altered based upon commands received by the driver 44 from the controller 32, the like, or a combination thereof. The commands communicated to the driver 44 from the controller 32 are based upon the signal communicated from the sensor 30 to the controller 32, the inputs entered by a user using the user input 46, or a combination thereof, according to one embodiment. Typically, the controller 32 commands the driver 44 based upon the user input 46 and the signal communicated from the sensor 30, such that the user input 46 is commanding the variable transmittance material 26 to be configured in a desired state, and the sensor 30 monitors the state of the variable transmittance material 26 so that the controller 32 can accurately command the driver 44 to supply an adequate amount of electrical power to the variable transmittance material 26. The electrical window control system 18 can further include memory 47 that has one or more software routines that can be executed by the controller 32 to compare the one or more signals received from the sensor 30, to command the driver 44, the like, or a combination thereof.

According to one embodiment, the sensor 30 includes a first sensor element 48A and a second sensor element 48B. The first sensor element 48A is positioned to receive the emitted light from the light source 28 that propagates through the second substantially transparent substrate 22, the variable transmittance material 26, and the first substantially transparent substrate 20. The second sensor element 48B is positioned to receive the light emitted from the light source 28 that propagates through the first and second substantially transparent substrates 20,22, such that the emitted light passes through the area 24, wherein no variable transmittance material 26 is located. Thus, a reference signal is communicated from the sensor 30 that is representative of the light received by the second sensor element 48B, and a signal communicated from the sensor 30 is representative of the light received by the first sensor element 48A. In such an embodiment, the light source 28 can be an ambient light, such as light emitted from the sun.

The controller 32 can then receive and compare the signals received from the sensor 30 to determine if the variable transmittance material 26 is in the correct or desired transmittance state based upon the command entered with the user input 46. Thus, each available user selection can correspond to a predetermined maximum amount of light that can propagate through the first and second substantially transparent substrates 20,22 and the variable transmittance material 26 and be received by the first sensor element 48A. If the comparison between the signal communicated from the first sensor element 48A and the reference value or signal (e.g., the signal communicated from the second sensor element 48B) results in a determination that the amount of light propagating through the first and second substantially transparent substrates 20,22 and variable transmittance material 26 is greater than the predetermined maximum value for the selected transmittance state, then the controller 32 can command the driver 44 to increase the amount of electrical power supplied to the variable transmittance material 26. Similarly, if the comparison between the signal communicated from the first sensor element 48A and the reference value or signal (e.g., the signal communicated from the second sensor element 48B) results in a determination that the amount of light propagating through the first and second substantially transparent substrates 20,22 and variable transmittance material 26 is less than a predetermined minimum value, than the controller 32 can command the driver 44 to reduce the amount of electrical power to the variable transmittance material 26.

Additionally, the controller 32 can automatically control the driver 44 to supply electrical power to control the variable transmittance material 26 automatically without an input entered using the user input 46, wherein the controller 32 commands the driver 44 based upon the light received by the second sensor element 48B. Thus, the controller 32 can automatically control the variable transmittance material 26 based upon the amount of light (e.g., ambient light) detected by the sensor 30, so that the variable transmittance material 26 can be made more or less transparent.

By way of explanation and not limitation, a default value can be set that corresponds to a transmittance state, wherein a predetermined maximum amount of ambient light that can propagate through the first and second substantially transparent substrates 20,22 and the variable transmittance material 26. The controller 32 can then automatically command the driver 44 to supply more or less electrical power to the variable transmittance material 26, so that the comparison between the signal communicated from the first sensor element 48A and the reference signal (e.g., the signal communicated from the second sensor element 48B) results in the driver 44 supplying more or less electrical power to the variable transmittance material 26 to maintain the predetermined maximum amount of ambient light propagating through the first and second substantially transparent substrates 20,22 and the variable transmittance material 26. Alternatively, the default value can be set that corresponds to a transmittance state, wherein a predetermined minimum amount of ambient light that can propagate through the first and second substantially transparent substrates 20,22 and the variable transmittance material 26. In such an embodiment, the controller 32 can then automatically command the driver 44 to supply more or less electrical power to the variable transmittance material 26, so that the comparison between the signal communicated from the first sensor element 48A and the reference signal (e.g., the signal communicated from the second sensor element 48B) results in the driver 44 supplying more or less electrical power to the variable transmittance material 26 to maintain the predetermined minimum amount of ambient light propagating through the first and second substantially transparent substrates 20,22 and the variable transmittance material 26.

Figure 4:
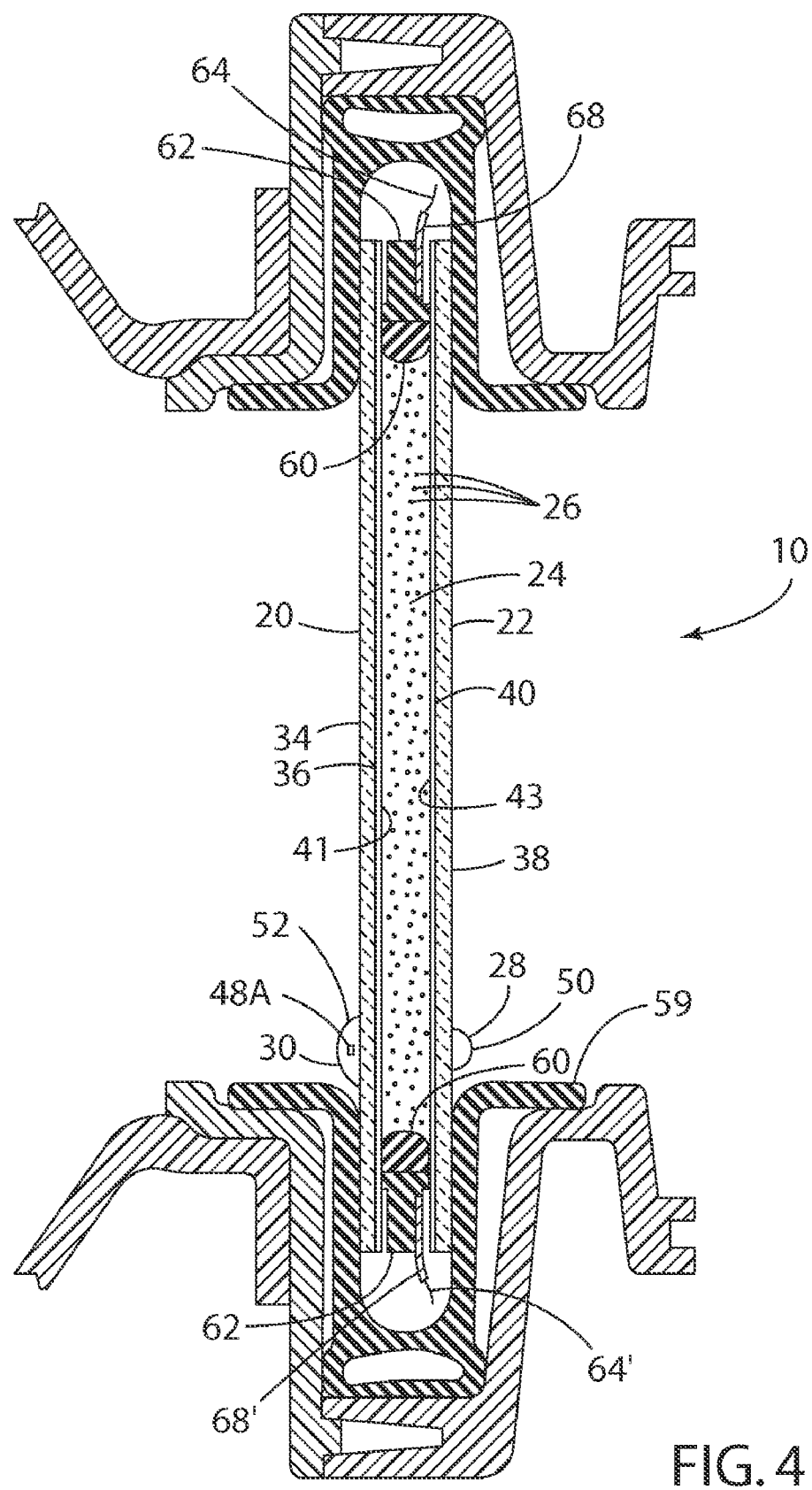
FIG. 4 is a partial cross-sectional view of a variable transmission window and supporting structure, in accordance with another embodiment of the present invention.

According to an alternate embodiment shown in both FIGS. 3 and 4, the sensor 30 can be located on the exterior side 34 of the first substantially transparent substrate 20 and include the first sensor element 48A, and the light source 28 can be located on the exterior side 38 of the second substantially transparent substrate 22. Typically, the light received by the first sensor element 48A propagates through the first and second substantially transparent substrates 20,22 and the variable transmittance material 26. In such an embodiment, the light source 28 and sensor 30 are separate components, such that the light source 28 includes a light source housing 50, and the sensor 30 includes a sensor housing 52.

The sensor 30 can communicate the signal to the controller 32 based upon the light received from the light source 28. The reference value used by the controller 32 to compare to the signal received from the sensor 30 can be a value representative of the light received by the first sensor element 48A from the light source 28 when the transmittance state of the variable transmittance material 26 is substantially transparent or clear. The controller 32 can control the driver 44 to supply electrical power to the variable transmittance material 26 based upon a command inputted with the user input 46, such that the controller 32 can accurately control the driver 44 so that the driver 44 can supply adequate electrical power to the variable transmittance material 26 based upon the signal received from the sensor 30 that is representative of the transmittance state of the variable transmittance material 26. For purposes of explanation and not limitation, each available user selection on the user input 46 can correspond to a predetermined maximum amount of light that can propagate through the first and second substantially transparent substrates 20,22 and the variable transmittance material 26 and be received by the sensor 30. Therefore, if it is determined that the amount of light being received by the sensor 30 from the light source 28 is greater than an amount that should be received for the currently selected user selection (e.g., the result of the comparison between the communicated signal and the reference value), the controller 32 can control the driver 44 to increase the amount of electrical power to the variable transmittance material 26 to reduce the transmittance of the variable transmittance material 26. Similarly, if the comparison between the signal communicated from the first sensor element 48A and the reference value or signal (e.g., the signal communicated from the second sensor element 48B) results in a determination that the amount of light propagating through the first and second substantially transparent substrates 20,21, and the variable transmittance material 26 is less than a predetermined minimum value, then the controller 32 can command the driver 44 to reduce the amount of electrical power to the variable transmittance material 26.

Figure 5:
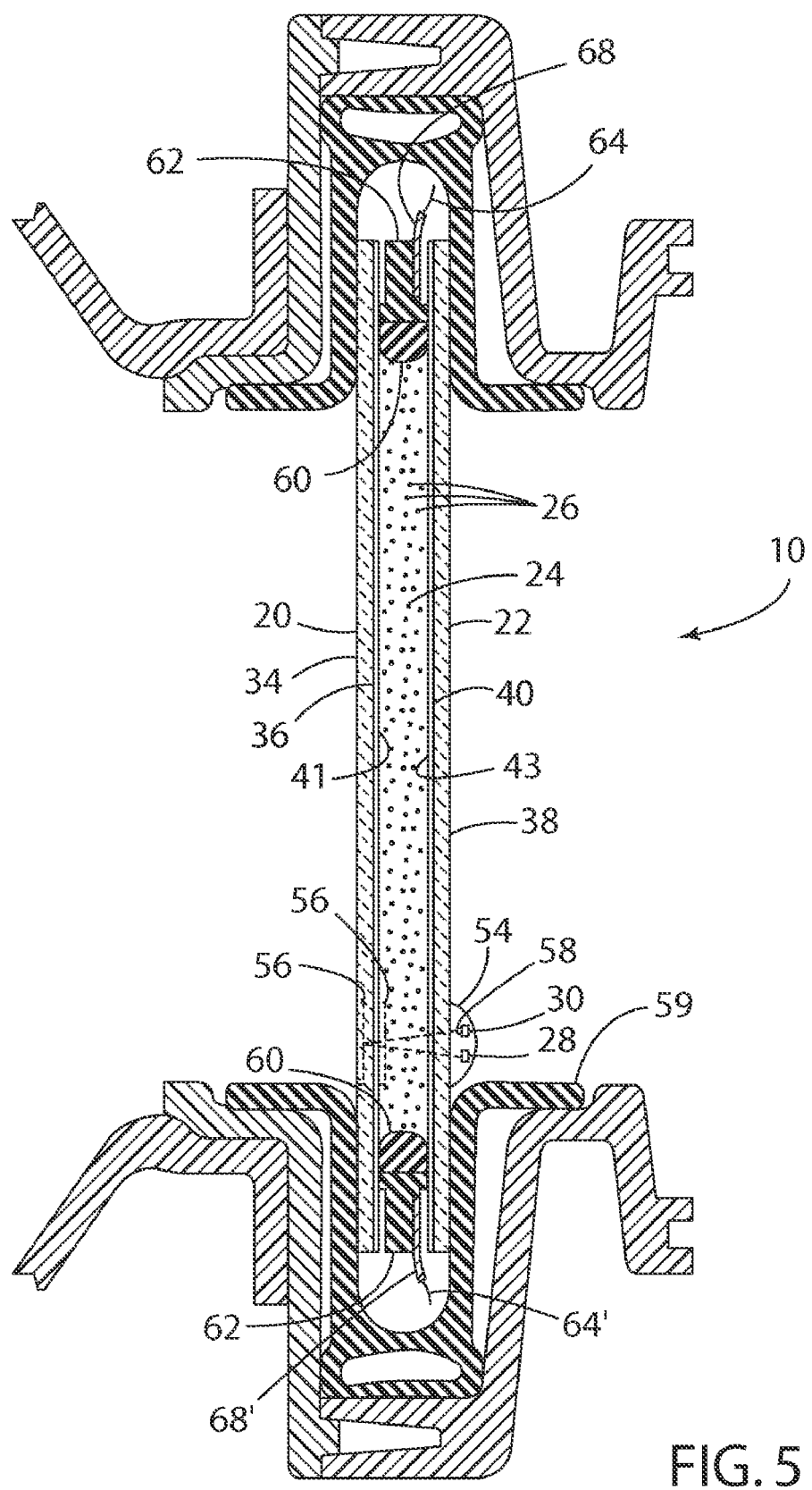
FIG. 5 is a partial cross-sectional view of a variable transmission window and supporting structure, in accordance with yet another embodiment of the present invention.

According to an alternate embodiment shown in both FIGS. 3 and 5, the light source 28 and sensor 30 are located on either the first or second substantially transparent substrate 20,22, and a reflective surface 56 is located on the opposite one of the first or second substantially transparent substrate 20,22. By way of explanation and not limitation, as shown in FIG. 5, the light source 28 and sensor 30 are located on the exterior side 38 of the second substantially transparent substrate 22, and the reflective surface 56 is located on the exterior side 34 of the first substantially transparent substrate 20, according to one embodiment. According to an alternate embodiment, the reflective surface 56 (shown in phantom in FIG. 5) can be located on the interior side 36 of the first substantially transparent substrate 20. It should be appreciated that the reflective surface 56 can be located on either the exterior side 38 or the interior side 40 of the second substantially transparent substrate 22, and the light source 28 and sensor 30 located on the exterior side 34 of the first substantially transparent substrate 20. In either embodiment, the controller 32 is configured to compare the signal received from the sensor 30 with respect to a predetermined attenuation value. The predetermined attenuation value can be determined based upon the amount of light attenuation when the emitted light propagates through the second substantially transparent substrate 22 and the variable transmittance material 26 twice when the reflective surface 56 is on the interior side 36 of the first substantially transparent substrate 20, according to one embodiment. Alternatively, the predetermined attenuation value can be determined based upon the amount of light attenuation when the emitted light propagates through the first and second substantially transparent substrates 20,22 and the variable transmittance martial 26 twice when the reflective surface is on the exterior side 34 of the first substantially transparent substrate material 20.

Typically, at least a portion of the light emitted by the light source 28 is reflected by the reflective surface 56, and at least a portion of the reflected light is received by the sensor 30. The sensor 30 can then communicate a signal to the controller 32, so that the controller 32 can command the driver 44 to supply electrical power to the variable transmittance material 26 based upon the signal received from the sensor 30 and the input entered with the user input 46. Each available user selection can correspond to a predetermined maximum amount of light that can propagate through the first and second substantially transparent substrates 20,22 and the variable transmittance material 26 and be received by the sensor 30. Therefore, if it is determined that the amount of light being received by the sensor 30 from the light source 28 is greater than an amount that should be received for the currently selected user selection (e.g., the result of the comparison between the communicated signal and the reference value), the controller 32 can control the driver 44 to increase the amount of electrical power to the variable transmittance material 26 to reduce the transmittance of the variable transmittance material 26. Similarly, if the comparison between the signal communicated from the first sensor element 48A and the reference value or signal (e.g., the signal communicated from the second sensor element 48B) results in a determination that the amount of light propagating through the first and second substantially transparent substrates 20,22 and the variable transmittance material 26 is less than a predetermined minimum value, than the controller 32 can command the driver 44 to reduce the amount of electrical power to the variable transmittance material 26.

According to one embodiment, the light source 28 and the sensor 30 are a single unit, such that the light source 28 and sensor 30 are enclosed in a single housing 54. Alternatively, the light source 28 and sensor 30 are separate units, such that the light source 28 is enclosed in the light source housing 50 and the sensor 30 is enclosed in the sensor housing 52. According to one embodiment, the reflective surface 56 is a mirror, a total internal reflection (TIR) lens, a Lambertian surface, the like, or a combination thereof.

In regards to FIGS. 2 and 4-5, according to one embodiment, the light source 28 can be configured to emit light at a predetermined wavelength. Additionally or alternatively, the sensor 30 can be configured to receive light at wavelengths that correspond to the wavelength of the light emitted by the light source 28. At least one filter 58 can be in optical communication with the sensor 30, wherein the filter 58 passes light at a predetermined wavelength, such that the predetermined wavelength corresponds to the wavelength of light emitted by the light source 28. Thus, the filter 58 can be integrated with the sensor 30, or separate from the sensor 30, but within the optical path of the light emitted from the light source 28 and received by the sensor 30. For purposes of explanation and not limitation, the filter 58 can be, but is not limited to, a spectral weighting filter, a neutral density filter, the like, or a combination thereof. Typically, by controlling the wavelength of the light transmitted by the light source 28 and/or the sensor 30 configured to receive light at a predetermined wavelength, the accuracy of the electrical window control system 18 can increase, since the light that affects the electrical window control system 18 is minimized (e.g., monitored light is at a predetermined wavelength).

Additionally or alternatively, the light source 28 can be configured to pulse the emitted light, such that the sensor 30 is configured to receive the pulsed light. Thus, the signal representative of the light received by the sensor 30 when the light source 28 is off can be subtracted from the signal representative of the light received by the sensor 30 when the light source 28 is pulsed on, to remove noise caused by ambient light, prior to comparing the signals to the reference value. Alternatively, the light source 28 can be pulsed between on states, such that the light source 28 continues to emit light, but at different brightnesses. By configuring the sensor 30 to receive light at a predetermined wavelength and/or a pulsed light, the amount of noise and/or the affect of the received noise received by the sensor 30, such as, but not limited to, undesirable ambient light, is minimized.

In regards to the exemplary embodiments shown in FIGS. 4 and 5, wherein the amount of ambient light received by the sensor 30 can be minimized, the light source 28 and the sensor 30 can be located on or adjacent to the first and second substantially transparent substrates 20,22, such that a support structure 59 does not enclose the light source 28 nor the sensor 30. According to an alternate embodiment, the sensor 28 and sensor 30 can be located on or adjacent to the first and second substantially transparent substrates 20,22, such that the support structure 59 at least partially encloses the light sensor 28 at the sensor 30.

With respect to FIGS. 1-6, according to one embodiment, once the variable transmittance material 26 has been deposited between the first and second substantially transparent substrates 20,22, a plug made of a cationic epoxy material may be placed into the fill hole to seal the fill hole. Typically, the variable transmittance material 26 is retained in the area 24 by the first and second substantially transparent substrates 20,22 and first and second seals 60,62. Additionally, first and second seals 60,62 can maintain the space between the surfaces of the first and second substantially transparent substrates 20,22. According to one embodiment, the first seal 60 and second seal 62 may include a material that substantially holds its size and shape, such that the first or second seal 60,62 material may be used to establish the spacing between the first and second substantially transparent substrates 20,22. According to one embodiment, electrochromatic supplies 64,64' are coupled to conductive structures 68,68'. Typically, the electrochromatic supplies 64,64' and the conductive structures 68,68' provide electrical power to the variable transmittance material 26 based upon the command entered by the user input 46, as described in greater detail herein.

Figure 6:
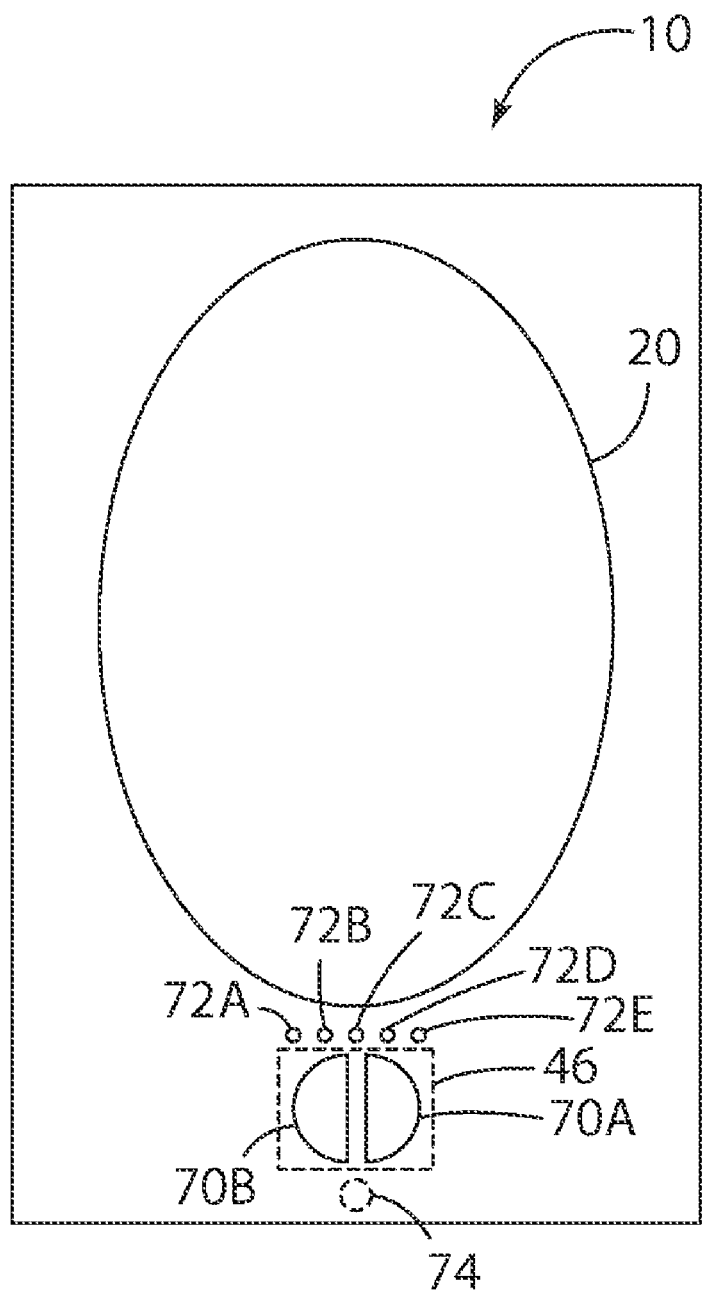
FIG. 6 is a front plan view of a variable transmission window, in accordance with one embodiment of the present invention.

In regards to FIG. 6, the user input device 46 can include first and second switches 70A,70B, respectively, wherein the first switch 70A can be configured to communicate a signal to the controller 32, which commands the driver 44 to provide electrical power to the variable transmittance material 26 in order for the variable transmittance material 26 to become less transparent, according to one embodiment. The second switch 70B can be configured to communicate a signal to the controller 32, which commands the driver 44 to provide electrical power to the variable transmittance material 26, such that the variable transmittance material 26 becomes more transparent. Additionally, the variable transmission window 10 can include a plurality of LEDs, which indicate the transmittance state of the variable transmittance material 26. For purposes of explanation and not limitation, the variable transmission window 10 can include a first LED 72A, a second LED 72B, a third LED 72C, a fourth LED 72D, and a fifth LED 72E, which each corresponds to a different transmittance state of the variable transmittance material 26. Thus, if the first LED 72A is illuminated, then the variable transmittance material 26 is in a clear state (e.g., the variable transmittance material 26 being in the highest transmittance state). However, if the fifth LED 72E is illuminated, then the variable transmittance material 26 is in the lowest transmittance state. Additionally, an LED 74 (shown in phantom) can be included in the variable transmission window 10, which indicates when a user is locked out from controlling the variable transmittance material 26, such that the user input 46 is inactive. In such a situation, the variable transmission window 10 may be controlled by a master controller 75 (FIG. 3).

In regards to FIGS. 1-6 and 8, a method of electrically controlling a variable transmission window 10 is generally shown in FIG. 8 at 1000. The method 1000 starts at step 1002, and proceeds to step 1004, wherein a transmittance state of the variable transmittance material 26 selected. Typically, the transmittance state of the variable transmittance material 26 is selected using the user input 46. At step 1006, an electrical power is supplied to the variable transmittance material 26. Generally, an increase in the amount of electrical power supplied to the variable transmittance material 26 decreases the transmittance state of the variable transmittance material 26. At step 1008, the light emitted from the light source 28 is monitored. Typically, the emitted light is monitored using the sensor 30, wherein the emitted light passes through the first and second substantially transparent substrates 20,22 and the variable transmittance material 26.

The method 1000 then proceeds to decision step 1010, wherein it is determined if the monitored light is greater than a reference value. If it is determined at decision step 1010 that the monitored light is not greater than the reference value, then the method 100 proceeds to step 1006, wherein the electrical power is continued to be supplied to the variable transmittance material 26. However, if it is determined at decision step 1010 that the monitored light is greater than the reference value, then the method 1000 proceeds to step 1012. At step 1012, the electrical power supplied to the variable transmittance material 26 is increased, such that the transmittance state of the variable transmittance material 26 decreases. From step 1012, the method can return to step 1008, wherein the light emitted from the light source 28 is monitored, or the method 1000 can end at step 1014.

In regards to FIGS. 1-7E, the electrical window control system 18 can include a monitor generally indicated in FIG. 7B at reference identifier 76. Typically, the monitor 76 monitors a voltage potential at terminals of the variable transmittance material 26, such as the electrochromatic supplies 64 and 64'. By monitoring the voltage potential at the electrochromatic supplies 64,64', the monitored voltage potential can be fed back to the controller 32, which can then execute one or more software routines based upon the received monitored voltage potential. The controller 32 can then alter the electrical power supplied to the variable transmittance material 26 based upon this monitored voltage potential. Thus, the controller 32 can more accurately control the electrical power supplied to the variable transmittance material 26, since the voltage potential at the electrochromatic supplies 64,64' should be within a predetermined range based upon the selected transmittance state (e.g., using first and second switches 70A,70B) and the signal communicated from the sensor 30.

Figure 7A:
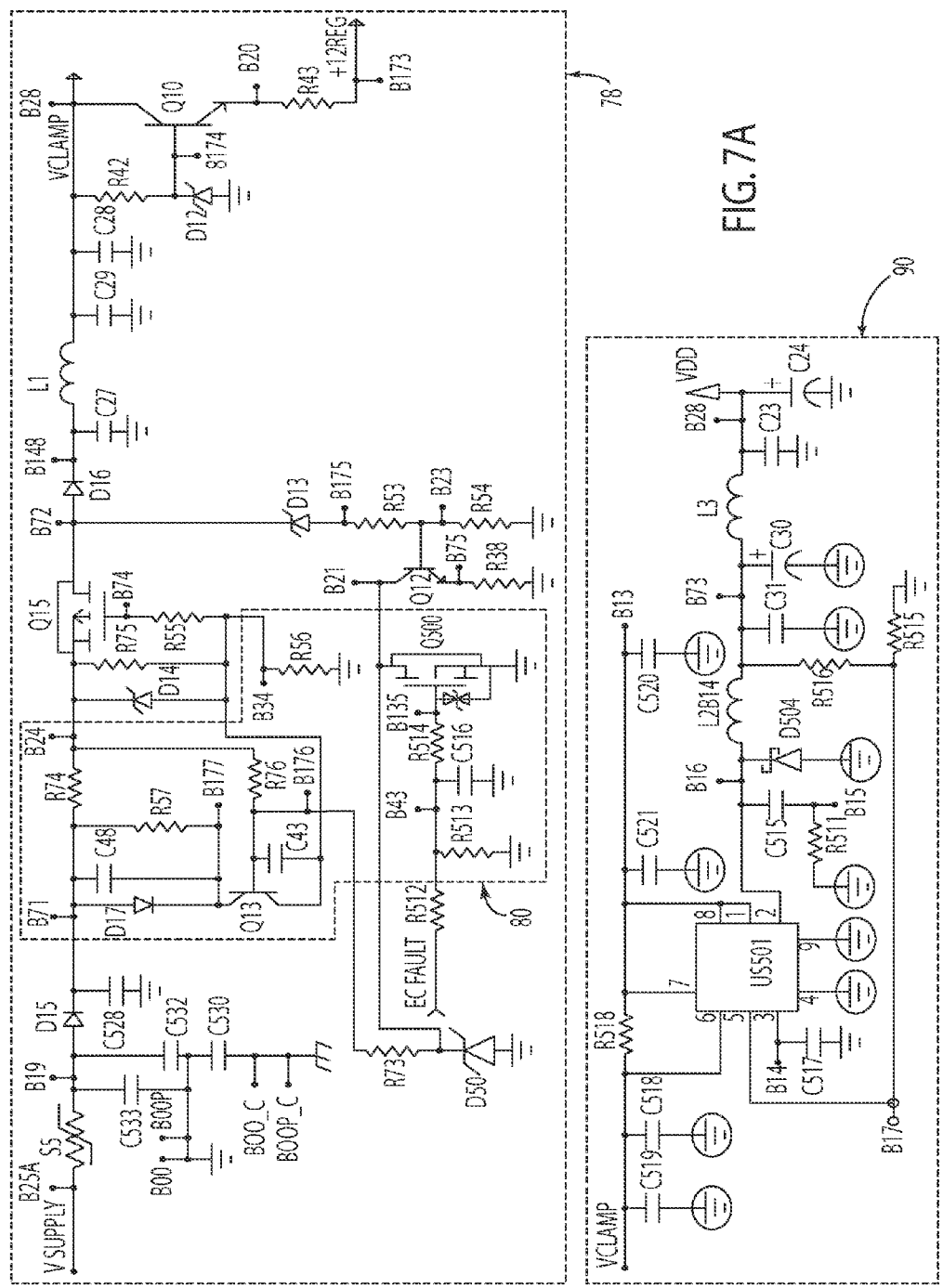

Additionally, the electrical window control system 18 can include an input clamp and regulator generally indicated in both FIGS. 7A and 7B at reference identifier 78. According to one embodiment, the input clamp and regulator 78 can include an overvoltage shutdown 80, wherein if the voltage exceeds a predetermined limit, then input clamp and regulator 78 is turned off, such that electrical power for the variable transmission window 10 is turned off. Thus, the voltage potential being monitored by the overvoltage shutdown 80 is the voltage potential of the variable transmission window 10. For purposes of explanation and not limitation, the voltage potential of the variable transmission window 10 can exceed the predetermined limit in the event lightning strikes the aircraft 12, or the like, containing the variable transmission window 10. In such a scenario, the overvoltage shutdown 80 would monitor and detect the excessive voltage potential resulting from the lightning strike, and the input clamp and regulator 78 would turn off, such that electrical power is not supplied to the variable transmission window 10.

Figure 7C:
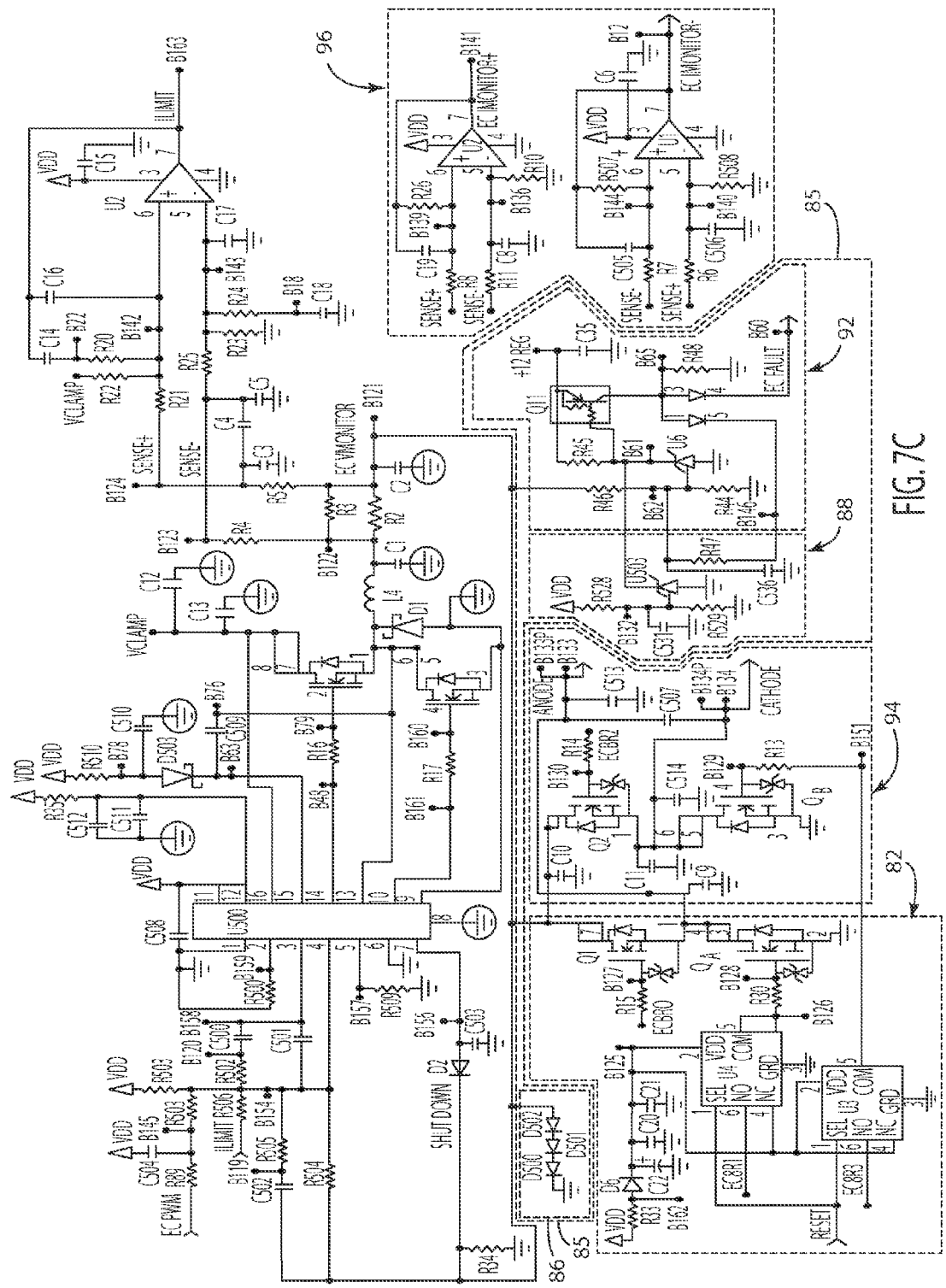
Figure 7D:
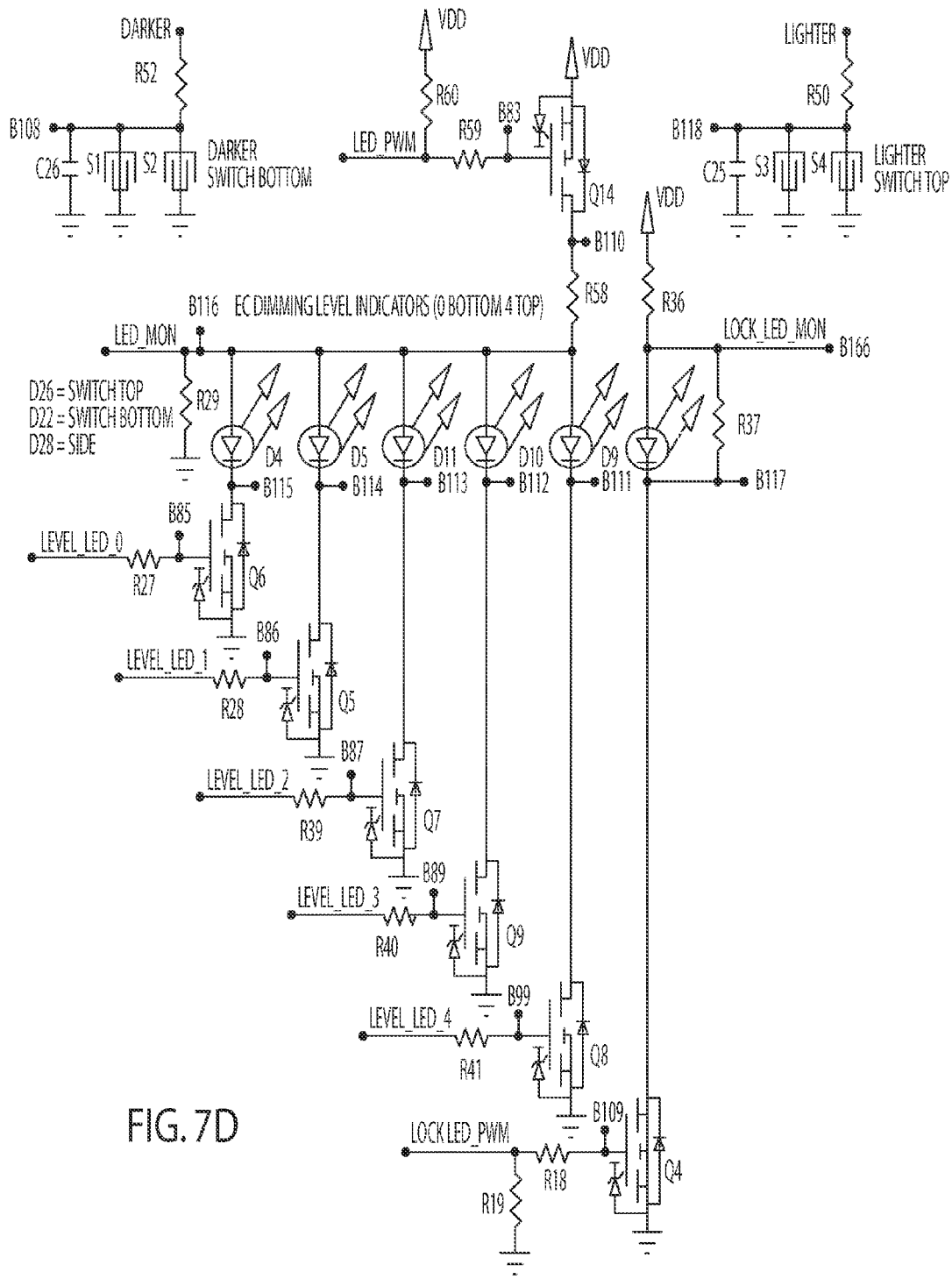
Figure 7E:
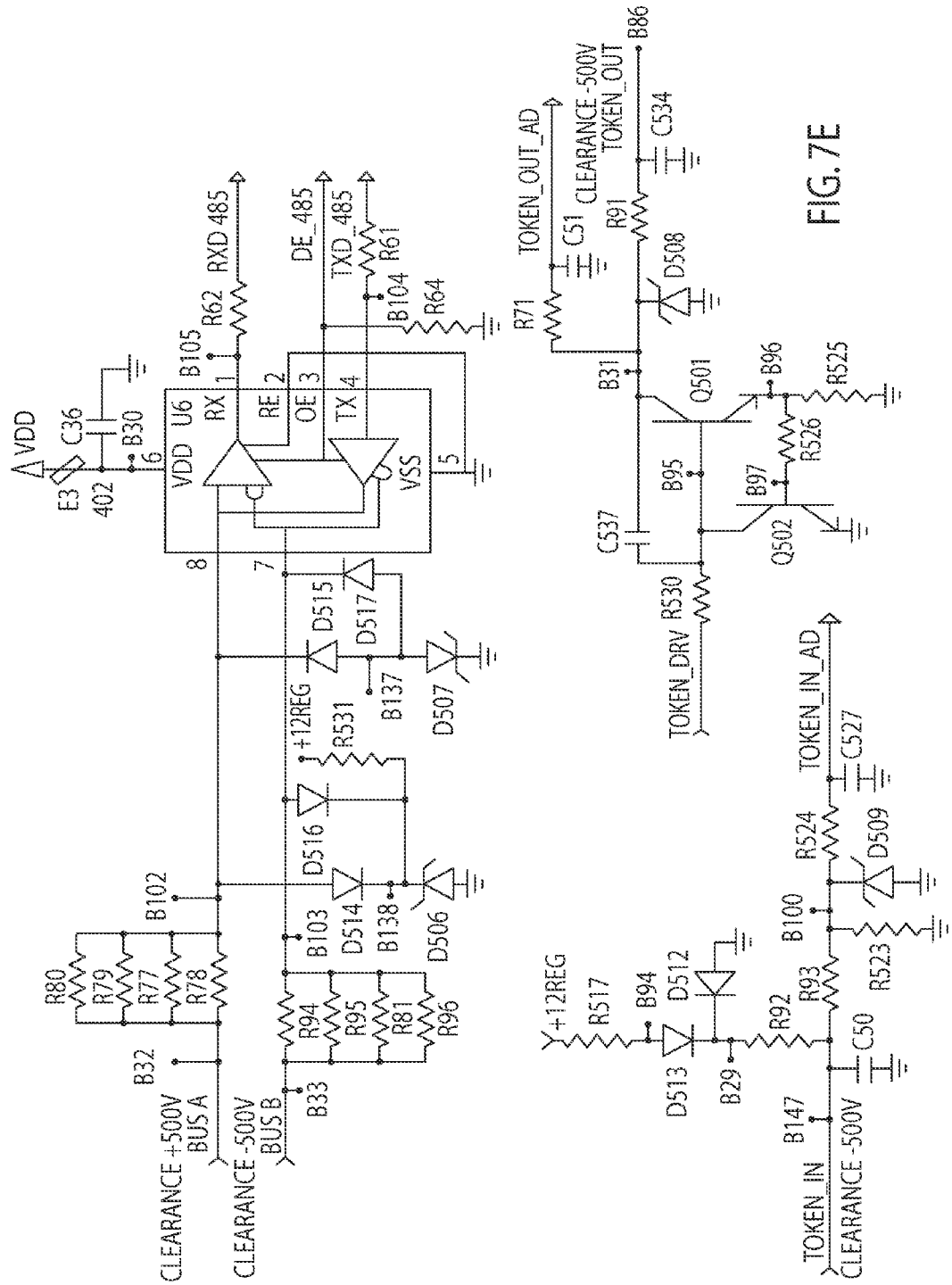

The electrical window control system 18 can further include a loss of power clearing device generally indicated in FIG. 7C at reference identifier 82, according to one embodiment. Typically, the loss of power clearing device 82 includes hardware circuitry, executable software routines, or a combination thereof, such that the variable transmittance material 26 is shorted when the input power to the variable transmission window 10 is turned off. Although at least some variable transmittance materials 26, such as, but not limited to, solution phase EC materials are self erasing, shorting the EC material can accelerate clearing of the EC material (e.g., the EC material is more transparent). Thus, the solution phase EC material can be advantageous, in that a small amount of energy needs to be stored to accelerate clearing, when compared to other materials or devices, such as, but not limited to, a solid-state EC material, a suspended particle device (SPD), a liquid crystal display (LCD), or a reversible electrochemical mirrors (REM) cell which typically require a larger amount of energy (e.g., a battery or large capacitor) to reach or maintain a clear state upon loss of power. Typically, an energy storage device supplies electrical power to at least one transistor (e.g., MOSFETs $Q_1$, $Q_2$, $Q_4$, $Q_B$), such that the energy stored in the variable transmittance material 26 is removed so that the variable transmittance material 26 substantially enters the clear state. According to one embodiment, a capacitor C22 supplies a stored charge to the gate of MOSFET Q1, such that the stored charge is removed from the variable transmittance material 26.

According to one embodiment illustrated in FIGS. 7B and 7C, the loss of power clearing device 82 receives a RESET signal from a reset U8, such that switches or selectors $U_{502}$, $U_3$, and $U_4$ open and close with respect to the RESET signal. The selectors $U_{502}$, $U_3$, and $U_4$ can be normally open/normally closed switches and configured so that the capacitor C22 can discharge and power and turn-on at least one MOSFET $Q_1$, $Q_2$, $Q_4$, $Q_B$ based upon reception of the RESET signal. Typically, an anode of the variable transmittance material 26 is electrically connected to a drain of MOSFETs $Q_1$ and $Q_4$, and a cathode of the variable transmittance material 26 is electrically connected to a drain of MOSFETs $Q_2$ and $Q_B$, such that when the MOSFETs $Q_1$, $Q_2$, $Q_4$, $Q_B$ are turned-on, the variable transmittance material 26 is shorted to ground and the variable transmittance material 26 substantially enters the clear state.

Typically, the SPD is substantially opaque when in an unpowered sate and is substantially clear when in a powered state. According to one embodiment, the opaque state is a transmittance state other than the substantially clear transmittance state. In such an embodiment that implements the SPD, which has transmittance states that are opposite of the EC material, the electrical control system 18 can control and/or monitor the transmittance state of the SPD similar to the EC material but by reducing the electrical power supplied to the SPD material to decrease the transmittance of the SPD and increase the electrical power supplied to the SPD to increase the transmittance of the SPD material (e.g., clear state). In an embodiment that implements an LCD, the electrical control system 18 can control the LCD similar to the EC material or the SPD. Alternatively, an embodiment that implements the REM cell typically functions by plating and deplating reflective materials to alter the transmittance state.

The electrical window control system 18 can further include surge protection, which can include a remote power distribution unit (RPDU) and a thermal detection device generally indicated in FIG. 7B at reference identifier 83. Typically, the surge protection is a double current protection, such that an initial electrical current ($I_{INITIAL}$) is limited and lower than a limited current ($I_{LIMIT}$), such that the initial current ($I_{INITIAL}$) does not trip the RPDU. However, in the event of a short circuit in the controller, a higher long term current limit takes effect (e.g., approximately double the inrush limit), which results in the RPDU tripping, the thermal monitoring device 83 detecting a temperature increase due to the excessive electrical current, or a combination thereof. By way of explanation and not limitation, the thermal monitoring device 83 can be, but is not limited to, a positive temperature coefficient (PTC) thermistor, a negative temperature coefficient (NTC) thermistor, a thermocouple, or the like.

The electrical window control system 18 can further include a power dropout device generally indicated in FIG. 7B at reference identifier 84. Typically, the power dropout device 84 can control the transmittance state of the variable transmittance material 26 based upon the period of time that the power has been turned off from the variable transmission window 10. Thus, if the power has been turned off for a short period of time, the variable transmittance material 26 can be returned to the transmittance state that the variable transmittance material 26 was in prior to the power turnoff. According to one embodiment, the period of time that the power is turned off and the variable transmittance material 26 is returned to the transmittance state as it was prior to the power turn off is less than one second (1 s). In such an embodiment, the period of time that the power is turned off and the variable transmittance material 26 is returned to the transmittance state as it was prior to the power turn off is less than 800 milliseconds (800 ms). Additionally, if the power has been turned off for a long period of time (e.g., greater than one second (1 s)), then the dropout device 84 controls the variable transmittance material 26 to be in a clear state, such that the electrical power is bled from a capacitor C7, as described above. According to one embodiment, the power dropout device 84 can determine how long the power has been turned off by a decrease in an electrical charge of a capacitor that is bleeding, such as, but not limited to, capacitor C7.

By way of explanation and not limitation, when the variable transmission window 10 is powered or turned-on, the TIMER SET of the power dropout device 84 is high and the capacitor C7 is charged. When the power to the variable transmission window 10 is turned-off, the TIMER SET is low and the capacitor C7 bleeds to ground over a resister R12. When the variable transmission window 10 is again powered, a voltage potential of the capacitor C7 is compared to a reference voltage potential by comparator U1. If it is determined that the voltage potential of the capacitor C7 is below the reference voltage potential, then it can be determined that the variable transmission window 10 has been turned-off for a time period greater than a predetermined time period, and the variable transmittance material 26 receives an adequate amount of electrical power to enter a default turn-on transmittance state. Typically, the predetermined time period corresponds to the reference voltage potential. However, if it is determined that the voltage potential of the capacitor C7 is greater than or equal to the reference voltage potential, then it can be determined that the variable transmission window 10 has been turned-off for a time period less than a predetermined time period, and the variable transmittance material 26 receives an adequate amount of electrical power to enter the transmittance state that the variable transmittance material 26 was in prior to the variable transmission window 10 being turned-off.

The electrical window control system 18 can further include an overvoltage protection device generally indicated in FIG. 7C at reference identifier 85. The overvoltage protection device 85 can include a first detection device 86, which clamps the voltage when it is determined that the voltage potential of the electrical power supplied to the variable transmittance material 26 exceeds a predetermined limit. According to one embodiment, the first detection device 86 includes three (3) diodes in series, which typically allow an electrical current to flow in a predetermined direction, and clamps the flow of electrical current under predetermined conditions.

The overvoltage protection device 85 can further include a second detection device 88 that monitors electrical power supplied from a power supply generally indicated in FIG. 7A at reference identifier 90. Thus, if the electrical power is supplied from the power supply 80 at a voltage potential higher than a predetermined limit, then the second detection device 88 can cut off the electrical power supplied from the power supply 90. The overvoltage protection device 85 can further include a third detection device generally indicated in FIG. 7C at reference identifier 92. The third detection device 92 can detect when the electrical power that is provided to the variable transmittance material 26 has a voltage potential of greater than the predetermined limit. According to one embodiment, the predetermined limit is 1.82 Volts, wherein the maximum window drive voltage is plus or minus 1.3 Volts from ground.

According to one embodiment, the electrical window control system 18 further includes a pulse clearing polarity device generally indicated in FIG. 7C at reference identifier 94. Typically, the pulse clearing polarity device 94 is used to control the electrical power provided to the variable transmittance material 26 in order to alter the transmittance state of the variable transmittance material 26. By way of explanation and not limitation, when a command is entered using the user input device 46, the electrical power is supplied to the variable transmittance material 26, such as a transitional current, in order to alter the transmittance state of the variable transmittance material 26. Typically, the transitional current is controlled by the pulse clearing polarity device 94, such that the transitional current is applied with reverse polarity for a predetermined period of time, and then the electrical current is shorted for another predetermined period of time. This pattern can cycle until the variable transmittance material 26 is at a desired transmittance state (e.g., based upon the input from the user input 46). By controlling the electrical current using the pulse clearing polarity device 94, the time to alter the transmittance state of the variable transmittance material 26 is minimized. Typically, the transitional current is measured for controlling the pulse clearing polarity device 94, rather than the steady-state current once the variable transmittance material 26 is in the desired state. In such a scenario, this is due to the steady-state current varying based upon the temperature of the variable transmission window 10.

Additionally, the electrical window control system 18 can include an adaptive transition time indicator device generally indicated in FIG. 7C at reference identifier 96. Typically, the adaptive transition time indicator device 96 determines when the steady-state current applied to the variable transmittance material 26 has been reached, such that the indicator LED can indicate that the desired transmittance state has been reached (e.g., flashing one of the first LED 72A, second LED 72B, third LED 72C, fourth LED 72D, and fifth LED 72E, respectively). According to one embodiment, the adaptive transition time indicator device 96 determines when the steady-state current has been reached by monitoring the transition current rather than the steady-state current, since the steady-state current can vary based upon the temperature. By way of explanation and not limitation, when the temperature of the variable transmission window 10 is operating under higher ambient temperature conditions, the transition time between states of the variable transmittance material 26 transitions faster than when the variable transmission window 10 is operating under cold ambient temperature conditions.

According to one embodiment, the temperature of the light source 28 can be determined, such that the reference value compared to the output of the sensor 30 is altered based upon the determined temperature. Thus, since the time period for altering the transmittance state of the variable transmittance material 26 can alter based upon the temperature, the reference value can also be altered to compensate for this characteristic of the variable transmittance material 26, according to one embodiment. In such an embodiment, the thermal monitoring device 83, or other suitable thermal monitoring device, can communicate a monitored temperature to the controller 32, which can vary which reference values are used to compare to the signal communicated from the sensor 30 to the controller 32.

The above description is considered that of preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. An electrical window control system comprising:
   a variable transmission window comprising:
   a first substantially transparent substrate;
   a second substantially transparent substrate, wherein said first and second substantially transparent substrates define an area; and
   a variable transmittance material that occupies at least a portion of said area;
   a power source that supplies an electrical power to said variable transmittance material, wherein an altering of a transmittance state of said variable transmittance material is based upon altering said supplied electrical power;
   at least one light source that emits light towards said variable transmission window, such that said emitted light is adapted to substantially propagate through at least one of said first and second substantially transparent substrates based upon said transmittance state of said variable transmittance material;
   at least one sensor in optical communication with said at least one of light source, wherein said at least one sensor receives at least a portion of said emitted light that propagates through at least one of said first and second substantially transparent substrates, and communicates a signal that corresponds to said received light; and
   a controller in communication with said at least one sensor, wherein said controller receives and compares said signal communicated from said at least one sensor to a reference value, and said controller controls an electrical power supplied from said power source to said variable transmittance material based upon said comparison of said communicated signal and said reference value, such that said transmittance state of said variable transmittance material is altered with respect to said light received by said at least one sensor.

2. The electrical window control system of claim 1, wherein said variable transmittance material is an electrochromatic (EC) material.

3. The electrical window control system of claim 1, wherein said at least one sensor is on an exterior side of said first substantially transparent substrate, and said at least one light source is on an exterior side of said second substantially transparent substrate, such that said at least one light source emits light through said first and second substantially transparent substrates and said variable transmittance material, so that at least a portion of said emitted light is received by said at least one sensor.

4. The electrical window control system of claim 1, wherein said reference value corresponds to a value representative of light received by said at least one sensor when said variable transmission window is configured to be substantially transparent.

5. The electrical window control system of claim 1, wherein said at least one light source and said at least one sensor are separate devices and housed as separate components.

6. The electrical window control system of claim 1, wherein said at least one light source and said at least one sensor are a single device, such that said at least one light source and said at least one sensor are substantially enclosed in a housing.

7. The electrical window control system of claim 1, wherein said at least one light source and said at least one sensor are on an exterior side of one of said first and second substantially transparent substrates.

8. The electrical window control system of claim 7, wherein a reflective surface is integrated with one of said first and second substantially transparent substrates opposite of said at least one light source and said at least one sensor, such that at least a portion of said light emitted from said at least one light source is reflected by said reflective surface and received by said at least one sensor.

9. The electrical window control system of claim 8, wherein said first and second substantially transparent substrates that comprise said reflective surface, further comprise an exterior surface and an interior surface, such that said reflective surface is integrated on one of said exterior and interior surfaces so that at least a portion of said light emitted from said at least one light source propagates from said at least one light source through said variable transmittance material, is reflected by said reflective surface, and propagates through said variable transmittance material and received by said sensor.

10. The electrical window control system of claim 8, wherein said reflective surface is a specular reflective surface.

11. The electrical window control system of claim 8, wherein said reflective surface is a Lambertian reflective surface.

12. The electrical window control system of claim 1, wherein said at least one light source is at least one of a light emitting diode (LED), an incandescent lamp, a laser diode, and an ambient light source.

13. The electrical window control system of claim 1, wherein said at least one sensor comprises a first sensor and a second sensor that are located on one of said first and second substantially transparent substrates opposite said light source.

14. The electrical window control system of claim 13, wherein said first sensor is configured to receive said light emitted from said at least one light source that propagates through said first and second substantially transparent substrates and said variable transmittance material.

15. The electrical window control system of claim 14, wherein said second sensor is configured to receive light emitted from said at least one light source that propagates through said first and second substantially transparent substrates, such that said area between said first and second substantially transparent substrates that said light propagates through does not contain said variable transmittance material.

16. The electrical window control system of claim 15, wherein a first output communicated from said first sensor and a second output communicated from said second sensor are compared, such that said reference value comprises said second output, wherein said electrical power supplied to said variable transmittance material is altered based upon said comparison of said first output and said second output.

17. The electrical window control system of claim 1 further comprising at least one filter in optical communication with said at least one sensor, wherein said at least one filter passes said light at a predetermined wavelength, such that said predetermined wavelength corresponds to a wavelength of light emitted by said at least one light source.

18. The electrical window control system of claim 17, wherein said at least one filter is a spectral weighting filter.

19. The electrical window control system of claim 17, wherein said at least one filter is a neutral density filter.

20. The electrical window control system of claim 1, wherein said controller controls said electrical power supplied to said variable transmittance material based upon a plurality of said sensor outputs that are received by said controller over a predetermined period of time.

21. The electrical window control system of claim 1, wherein said at least one sensor is at least one of a cadmium sulfide (CdS) cell, a phototransistor, a photodiode, and a light sensing integrated circuit.

22. The electrical window control system of claim 1, wherein said at least one light source pulses said light emitted and received by said sensor.

23. The electrical window control system of claim 1, wherein a temperature of said at least one light source is determined, such that said reference value compared to said output of said sensor is altered based upon said determined temperature.

24. The electrical window control system of claim 1, wherein when said controller substantially does not supply said electrical power to said variable transmittance material, said variable transmittance material is configured to be substantially transparent.

25. The electrical window control system of claim 1 further comprising a surge protection that comprises a remote power distribution unit (RPDU) and a thermal detection device, such that a short circuit in said controller trips at least one of said RPDU and said thermal detection device.

26. A method of electrically controlling a variable transmission window, said method comprising the steps of:
   emitting light towards a variable transmission window;
   propagating at least a portion of said emitted light substantially through first and second substantially transparent substrates of said variable transmission window that define an area, wherein a variable transmittance material occupies at least a portion of said area;
   supplying an electrical power to said variable transmittance material to control a transmittance state of said variable transmittance material;
   detecting said emitted light that is adapted to propagate through said first and second substantially transparent substrates;
   communicating a signal representative of said detected light;
   receiving said communicated signal, such that said received signal is compared to a reference value; and
   altering said electrical power supplied to said variable transmittance material based upon said comparison of said received signal and said reference value, such that said transmittance state of said variable transmittance material is altered based upon said detected light.

27. The method of claim 26, wherein said variable transmittance material is an electrochromatic (EC) material.

28. The method of claim 26, wherein said emitted light is emitted from an exterior side of said second substantially transparent substrate, and said emitted light is received at an exterior side of said first substantially transparent substrate, such that said emitted light propagates through said first and second substantially transparent substrates and said variable transmittance material, so that at least a portion of said emitted light is received by said at least one sensor.

29. The method of claim 26, wherein said reference value corresponds to a value representative of light received by said at least one sensor when the variable transmission window is configured to be substantially transparent.

30. The method of claim 26, wherein said emitted light is emitted and detected at an exterior side of one of said first and second substantially transparent substrates.

31. The method of claim 30 further comprising the step of reflecting said emitted light, such that said light is reflected at one of said first and second substantially transparent substrates opposite of where said light is emitted and detected, so that at least a portion of said emitted light is reflected and detected.

32. The method of claim 31, wherein said emitted light is reflected by a Lambertian reflective surface.

33. The method of claim 31, wherein said emitted light is reflected by a specular reflective surface.

34. The method of claim 26, wherein said emitted light is emitted by at least one of a light emitting diode (LED), an incandescent lamp, a laser diode, and an ambient light source.

35. The method of claim 26, wherein said step of detecting said emitted light further comprises providing a first sensor and a second sensor that are located on one of said first and second substantially transparent substrates opposite where said light is emitted.

36. The method of claim 35, wherein said first sensor is configured to receive said emitted light that propagates through said first and second substantially transparent substrates and said variable transmittance material.

37. The method of claim 36, wherein said second sensor is configured to receive light emitted from said light source that propagates through said first and second substantially transparent substrates, such that said area between said first and second substantially transparent substrates that said light propagates through does not contain said variable transmittance material.

38. The method of claim 37 further comprising the step of comparing a first output communicated from said first sensor and a second output communicated from said second sensor, such that said reference value comprises said second output, wherein said electrical power supplied to said variable transmittance material is altered based upon said comparison of said first output and said second output.

39. The method of claim 26 further comprising the step of filtering said detected light, such that said filtered light corresponds to a wavelength of said emitted light.

40. The method of claim 39, wherein said filtered detected light is filtered by a spectral weighting filter.

41. The method of claim 39, wherein said filtered detected light is filtered by a neutral density filter.

42. The method of claim 26 further comprising the step of receiving a plurality of outputs based upon said detected light that are received over a predetermined period of time.

43. The method of claim 26, wherein said step of detecting said emitted light further comprises providing at least one sensor, wherein said at least one sensor is at least one of a cadmium sulfide (CdS) cell, a phototransistor, a photodiode, and a light sensing integrated circuit.

44. The method of claim 26, wherein said light emitted from said light source is pulsed.

45. The method of claim 26 further comprising the step of determining said reference value based upon a temperature of a light source that emits said emitted light.

46. The method of claim 26 further comprising the step of configuring said variable transmittance material to be substantially transparent when said electrical power is substantially not supplied to said variable transmittance material.

47. A feedback control system comprising:
a variable transmission window comprising:
a first substantially transparent substrate;
a second substantially transparent substrate, wherein said first and second substantially transparent substrates define an area; and
a variable transmittance material that occupies at least a portion of said area;
a power source that supplies an electrical power to said variable transmittance material, wherein an altering of a transmittance state of said variable transmittance material is based upon altering said supplied electrical power;
at least one light source that emits light towards said variable transmission window, such that at least a portion of said emitted light propagates through at least one of said first and second substantially transparent substrates based upon said transmittance state of said variable transmittance material;
at least one sensor in optical communication with said at least one light source, wherein said at least one sensor receives at least a portion of said emitted light that propagates through at least one of said first and second substantially transparent substrates, and communicates a feedback signal that corresponds to said received light; and
a controller in communication with said at least one sensor to form a closed loop, wherein said controller receives said feedback signal, and controls said electrical power supplied from said at least one power source to said variable transmittance material based upon said feedback signal, such that said transmittance state of said variable transmittance material is altered with respect to said light received by said at least one sensor.

48. The feedback control system of claim 47, wherein said variable transmittance material is an electrochromatic (EC) material.

49. The feedback control system of claim 47, wherein said at least one sensor is on an exterior side of said first substantially transparent substrate, and said at least one light source is on an exterior side of said second substantially transparent substrate, such that said at least one light source emits light through said first and second substantially transparent substrates and said variable transmittance material, so that at least a portion of said emitted light is received by said at least one sensor.

50. The feedback control system of claim 47, wherein said at least one light source and said at least one sensor are separate devices and housed as separate components.

51. The feedback control system of claim 47, wherein said at least one light source and said at least one sensor are a single device, such that said at least one light source and said at least one sensor are substantially enclosed in a housing.

52. The feedback control system of claim 47, wherein said at least one light source and said at least one sensor are on an exterior side of one of said first and second substantially transparent substrates.

53. The feedback control system of claim 52, wherein a reflective surface is integrated with one of said first and second substantially transparent substrates opposite of said at least one light source and said at least one sensor, such that at least a portion of said light emitted from said at least one light source is reflected by said reflective surface and received by said at least one sensor.

54. The feedback control system of claim 53, wherein said first and second substantially transparent substrates that comprise said reflective surface, further comprise an exterior surface and an interior surface, such that said reflective surface is integrated on one of said exterior and interior surfaces so that at least a portion of said light emitted from said at least one light source propagates from said at least one light source through said variable transmittance material, is reflected by said reflective surface, and propagates through said variable transmittance material and received by said sensor.

55. The feedback control system of claim 47, wherein said at least one light source is at least one of a light emitting diode (LED), an incandescent lamp, a laser diode, and an ambient light source.

56. The feedback control system of claim 47, wherein said at least one sensor comprises a first sensor and a second sensor that are located on one of said first and second substantially transparent substrates opposite said light source.

57. The feedback control system of claim 56, wherein said first sensor is configured to receive said light emitted from said at least one light source that propagates through said first and second substantially transparent substrates and said variable transmittance material.

58. The feedback control system of claim 57, wherein said second sensor is configured to receive light emitted from said at least one light source that propagates through said first and second substantially transparent substrates, such that said area between said first and second substantially transparent substrates that said light propagates through does not contain said variable transmittance material.

59. The feedback control system of claim 47 further comprising at least one filter in optical communication with said at least one sensor, wherein said at least one filter passes said light at a predetermined wavelength, such that said predetermined wavelength corresponds to a wavelength of light emitted by said at least one light source.

60. The feedback control system of claim 47, wherein said at least one sensor is at least one of a cadmium sulfide (CdS) cell, a phototransistor, a photodiode, and a light sensing integrated circuit.

* * * * *

UNITED STATES PATENT AND TRADEMARK OFFICE
CERTIFICATE OF CORRECTION

PATENT NO. : 7,535,614 B1
APPLICATION NO. : 12/127571
DATED : May 19, 2009
INVENTOR(S) : Tapley et al.

It is certified that error appears in the above-identified patent and that said Letters Patent is hereby corrected as shown below:

Column 4
line 18, "which are" should be --which is--.

line 33, "which are" should be --which is--.

line 41, "which are" should be --which is--.

Column 6
line 12, "user input 44" should be --user input 46--.

lines 21 and 22, "indium-tin oxide" should be --indium tin oxide--.

line 22, "two, full waves" should be --two full waves--.

line 41, "Ohms" should be --ohms--.

line 53, "Fig. 3" should be --Fig. 3,--.

Column 7
line 60, "than" should be --then--.

Column 9
line 17, "20,21," should be --20,21--.

line 52, "martial" should be --material--.

Column 10
line 15, "than" should be --then--.

line 61, "affect" should be --effect--.

Column 11
line 2, "nor" should be --or--.

Column 12
line 63, "material 26 selected" should be --material 26 is selected--.

line 12, "method 100" should be --method 1000--.

UNITED STATES PATENT AND TRADEMARK OFFICE
CERTIFICATE OF CORRECTION

PATENT NO.         : 7,535,614 B1
APPLICATION NO.    : 12/127571
DATED              : May 19, 2009
INVENTOR(S)        : Tapley et al.

It is certified that error appears in the above-identified patent and that said Letters Patent is hereby corrected as shown below:

Column 13
line 19, "Q1" should be --$Q_1$--.

line 28, "turn-on" should be --turn on--.

lines 34 and 35, "turned-on" should be --turned on--.

line 39, "sate" should be --state--.

Column 14
line 17, "turn off" should be --turnoff--.

line 21, "turn off" should be --turnoff--.

line 32, "turned-on" should be --turned on--.

line 35, "turned-off" should be --turned off--.

line 42, "turned-off" should be --turned off--.

line 45, "turn-on" should be --turn on--.

line 51, "turned-off" should be --turned off--.

line 56, "turned-off" should be --turned off--.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,535,614 B1
APPLICATION NO. : 12/127571
DATED : May 19, 2009
INVENTOR(S) : Tapley et al.

Page 1 of 2

Column 4
line 18, "which are" should be --which is--.

line 33, "which are" should be --which is--.

line 41, "which are" should be --which is--.

Column 6
line 12, "user input 44" should be --user input 46--.

lines 21 and 22, "indium-tin oxide" should be --indium tin oxide--.

line 22, "two, full waves" should be --two full waves--.

line 41, "Ohms" should be --ohms--.

line 53, "Fig. 3" should be --Fig. 3,--.

Column 7
line 60, "than" should be --then--.

Column 9
line 17, "20,21," should be --20,21--.

line 52, "martial" should be --material--.

Column 10
line 15, "than" should be --then--.

line 61, "affect" should be --effect--.

This certificate supersedes the Certificate of Correction issued December 1, 2009.

Signed and Sealed this

Eighth Day of June, 2010

David J. Kappos
*Director of the United States Patent and Trademark Office*

Column 11
line 2, "nor" should be --or--.

Column 12
line 63, "material 26 selected" should be --material 26 is selected--.

line 12, "method 100" should be --method 1000--.

Column 13
line 19, "Q1" should be --$Q_1$--.

line 28, "turn-on" should be --turn on--.

lines 34 and 35, "turned-on" should be --turned on--.

line 39, "sate" should be --state--.

Column 14
line 17, "turn off" should be --turnoff--.

line 21, "turn off" should be --turnoff--.

line 32, "turned-on" should be --turned on--.

line 35, "turned-off" should be --turned off--.

line 42, "turned-off" should be --turned off--.

line 45, "turn-on" should be --turnon--.

line 51, "turned-off" should be --turned off--.

line 56, "turned-off" should be --turned off--.